US012067084B1

(12) United States Patent
Smith et al.

(10) Patent No.: US 12,067,084 B1
(45) Date of Patent: Aug. 20, 2024

(54) APPARATUS AND METHODS FOR INCREASING PROXIMITY OF A SUBJECT PROCESS TO AN OUTLIER CLUSTER

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/409,636

(22) Filed: Jan. 10, 2024

(51) Int. Cl.
G06F 18/23 (2023.01)
G06F 18/2321 (2023.01)

(52) U.S. Cl.
CPC .............................. G06F 18/2321 (2023.01)

(58) Field of Classification Search
CPC .................................................. G06F 18/2321
See application file for complete search history.

(56) References Cited

U.S. PATENT DOCUMENTS

| | | | | |
|---|---|---|---|---|
| 11,934,416 | B2 * | 3/2024 | Barello | G06F 11/3438 |
| 2021/0133189 | A1 * | 5/2021 | Prado | G06F 16/2465 |
| 2021/0365478 | A1 | 11/2021 | Mopur | |
| 2023/0239344 | A1 * | 7/2023 | Bahm | H04L 67/561 |
| | | | | 709/223 |

FOREIGN PATENT DOCUMENTS

| | | |
|---|---|---|
| CN | 105930353 A | 9/2016 |
| WO | 2022/216582 A1 | 10/2022 |

* cited by examiner

*Primary Examiner* — Merilyn P Nguyen

(74) *Attorney, Agent, or Firm* — Caldwell Intellectual Property Law

(57) ABSTRACT

An apparatus and method for determining an instruction set is provided. The apparatus includes a processor and a memory connected to the processor. The memory contains instructions configuring the processor to receive multiple datasets, where each dataset describes actions performed by an entity and to generate, for each dataset of the datasets, an outlier cluster. Generating the outlier cluster includes aggregating data included in a dataset, identifying data within aggregated data based on similarity to actions, and assigning a quality score for the identified data based on assessing whether identified data exceeds a threshold value. The outlier cluster is determined based on the quality score. The processor may receive a subject process describing a current state of the entity and identify, for each outlier cluster, a process modification model that describes a set of actions to be performed to increase proximity of the subject process to each outlier cluster.

20 Claims, 11 Drawing Sheets

Mindset Scorecard | | | Name | | Date | |

| Mindsets | | 1 | 2 | 3 | 4 | 5 | 6 | 7 | 8 | 9 | 10 | 11 | 12 |
|---|---|---|---|---|---|---|---|---|---|---|---|---|---|
| 1 | Mindset is Everything | Other people who are less capable are advancing more rapidly | | | Missing something to make necessary breakthroughs | | | Mastered the tried-and-true principles of the industry | | | Understand that progress relates to identifying mindsets that determine success | | |
| 2 | Best/Worst Starting Point | Past experiences aren't valuable for solving current problems | | | Business frustrations are increasing faster than business satisfactions | | | Learned to depersonalize work relationships and eliminate emotionally-based judgments and decision-making | | | Evaluate contrast between best and worst experiences | | |
| 3 | Quantifying your Experience | | Understanding of customer expectations declines year-on-year 204D | | Uncertain as to what causes success compared to failure | | | Maxed out learning from past experiences | | | Forward morale, momentum, and motivation all increase as the result of continually quantifying your past experiences | | |
| 4 | Scoring is Exponential | Feel that other businesses have unfair advantages | | | Unfamiliar regarding how to adapt to changing industry and marketplace trends | | | Familiar with data that industry leaders have identified as important 212D | | | Continually transform and accelerate entrepreneurial success based on deepened foundation of increased scoring | | |
| 5 | Who You're Looking for is You | No longer enjoy engaging with customers since they are only interested in cost (and not quality) | | | Unfamiliar regarding how to create more value for top-performing team members and clients | | | Able to successfully engage with unpleasant people 208D | | | You create each new scorecard to identify individuals in every situation who will be most like minded and cooperative | | |
| 6 | Screening and Attracting | Resent working with unpleasant colleagues, but continue due to financial necessity | | | Study entrepreneurial successes of others but cannot incorporate relevant salient features into internal business practices | | | Recognize that only searching for like-minded people will result in missing out on some business opportunities | | | Accelerating the process of screening out those who aren't optimum maximizers and attracting those who are | | |
| 7 | Scorecard Marketing | Products and services are presented and sold in conventional ways, resulting in decline success rates | | | Searching for "secret formula" that will continually transform the quality of marketing and sales | | | Familiar with successful marketing practices in the industry | | | Approach to entering and operating within the marketplace uses mindset scoring | | |
| 8 | Endless Digital Expansion | Lack of understanding of tech breakthroughs used by competitor businesses | | | Uncertain as to how to incorporate digitization of sales | | | Feel that there aren't any new strategies or tech approaches that are exceptionally worthwhile | | | Usage of mindset scoring to grow business exponentially | | |

*FIG. 2D*

APPARATUS AND METHODS FOR INCREASING PROXIMITY OF A SUBJECT PROCESS TO AN OUTLIER CLUSTER

FIELD OF THE INVENTION

The present invention generally relates to the field of artificial intelligence (AI). In particular, the present invention is directed to an apparatus and methods for determining an instruction set.

BACKGROUND

Recent increases in computational efficiency have enabled iterative analysis of data describing complex phenomena; however, such data are only valuable inasmuch they accurately represent the complex phenomena in question and may fail for lack of systems to correctly identify a degree of inaccuracy in the iterative analysis itself. Prior programmatic attempts to resolve these and other related issues have suffered from inadequate user-provided data intake and subsequent processing capabilities.

SUMMARY OF THE DISCLOSURE

In an aspect, an apparatus for determining an instruction set is provided. The apparatus includes a processor and a memory connected to the processor. The memory contains instructions configuring the processor to receive, from a user device, multiple datasets. Each dataset of the multiple datasets describes multiple actions performed by an entity. The processor may generate, for each dataset of the multiple datasets, an outlier cluster. Generating the outlier cluster further includes aggregating data included in a dataset of the multiple datasets, identifying data within aggregated data based on similarity and matching at least a portion of the multiple actions, assigning a quality score for the identified data based on assessing whether identified data exceeds a threshold value, and generating the outlier cluster as a function of the quality score. The processor may receive, from the user device, a subject process describing a current state of the entity associated with the user device and identify, for the outlier cluster of each dataset, a process modification model, wherein the process modification model describes a set of actions to be performed to increase a proximity of the subject process to the outlier cluster. Accordingly, the processor may generate an interface data structure including an input field, wherein the interface data structure configures a remote display device to display the input field, receive a user-input datum into the input field, wherein the user-input datum describes data for updating the subject process, and display an instruction set determined using the process modification model, wherein displaying the instruction set includes displaying an updated subject process based on the user-input datum.

In another aspect, a method for determining an instruction set, the method including receiving, by a computing device and from a user device, multiple datasets, where each dataset of the multiple datasets describes multiple actions performed by an entity and generating, by the computing device, for each dataset of the multiple datasets, an outlier cluster. Generating the outlier cluster further includes aggregating data included in a dataset of the multiple datasets, identifying data within aggregated data based on similarity and matching at least a portion of the multiple actions, assigning a quality score for some identified data based on assessing whether identified data exceeds a threshold value, and generating the outlier cluster as a function of the quality score. The method also includes receiving, by the computing device and from the user device, a subject process describing a current state of the entity associated with the user device and identifying, by the computing device, for the outlier cluster of each dataset, a process modification model, where the process modification model describes a set of actions to be performed to increase a proximity of the subject process to the outlier cluster. Accordingly, the method includes generating by the computing device, an interface data structure including an input field, where the interface data structure configures a remote display device to display the input field, receive a user-input datum from the input field, where the user-input datum describes data for updating the subject process, and display an instruction set determined using the process modification model, wherein displaying the instruction set includes displaying an updated subject process based on the user-input datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2D is another example interactive display screen generated by the interface data structure of FIGS. 2A-2B;

Figure 1:
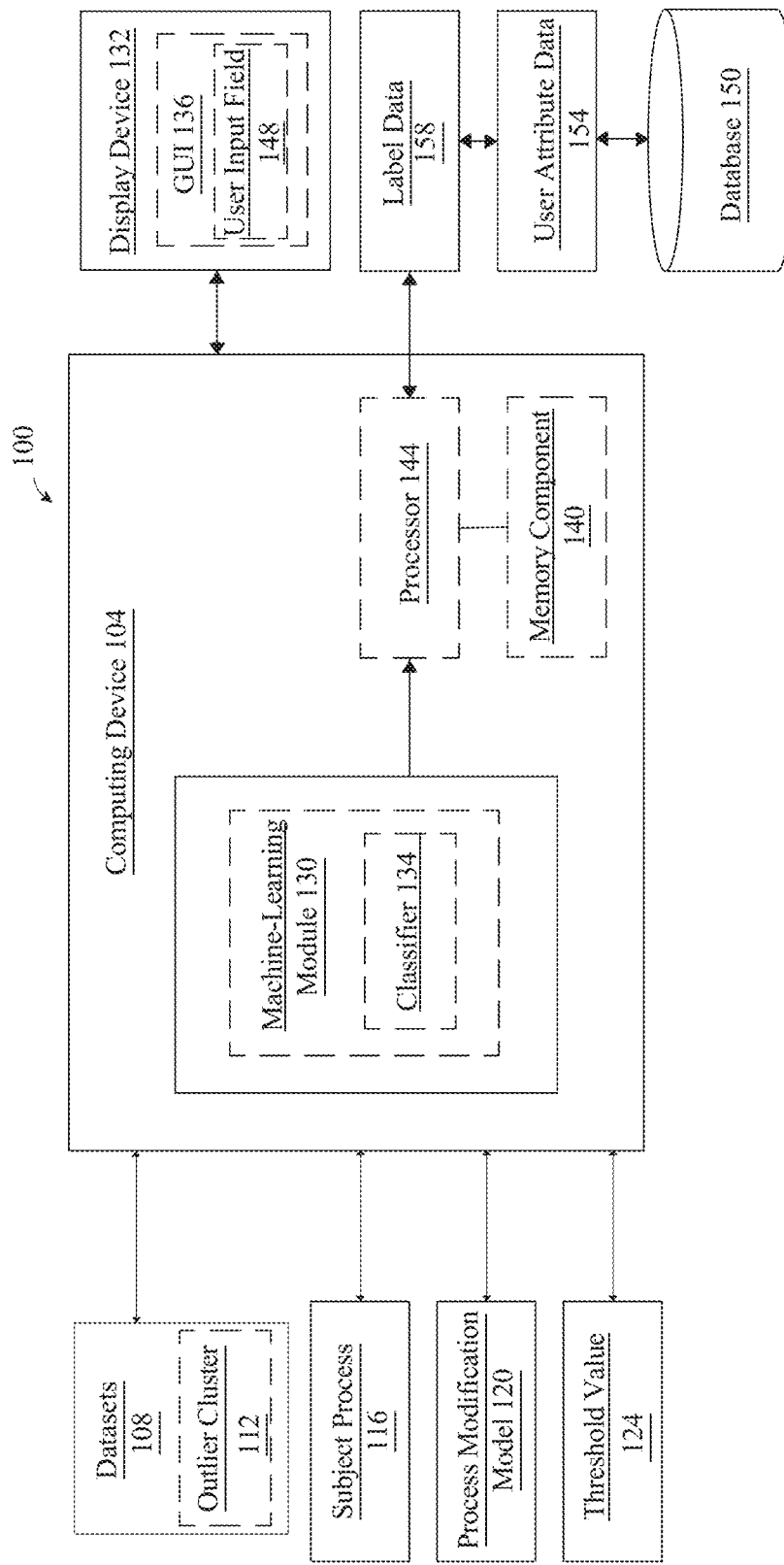
FIG. 1 is a block diagram of an embodiment of an apparatus for generating an instruction set for a user.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for determining an "instruction set." As used herein, an "instruction set" is a digital representation of a specific collection of commands or operations designed to be interpreted and executed by an entity, a device, a computer/processor, or otherwise a system. In some cases, instruction set may not include a specific order in which commands or operations may be interpreted and executed in any order as long as the dependencies and/or constraints of the entity, the device, the computer/processor, or otherwise the system are satisfied. For example, and without limitation, each independent command or operation may be executed simultaneously or in an unordered fashion across a plurality of entities in parallel. In other cases, instruction set may include a sequence of chronological steps, or instructions, generated in response to calculations using "subject process data" which are indicative of at least a subject process. A "subject process," for the purpose of this disclosure, refers to a selected form of phenomena, wherein at least a processed entity is transformed from one state to another state in a distinct direction. In a non-limiting example, phenomena may include general business strategy, or specific initiatives taken by up-and-coming entrepreneurs directed to establishing and growing newly formed businesses to thriving enterprises having reliable cash flow and customer bases. Accordingly, the instruction set in such circumstances may first digitally consider, by intaking data describing high-level surrounding conditions of an entity, such as descriptors including quantitative measures related to such as "mindset," "experience," "screening and attracting," and the like of the entity. In some cases, instruction set may incrementally provide step-by-step instructions in a textual format, and may be output by a display device such as a touch screen of a smartphone, for entity such as an entrepreneur to systematically change and improve certain aspects and behaviors relating to one or more subject processes, for example, and without limitation, running their startup in question to approach an desired condition, wherein the desired condition may be represented digitally by one or more outlier clusters (to be described further herein), and wherein each outlier cluster may be associated with an aspect of entity performance, such as, without limitation, sales, marketing, employee performance or the like.

Aspects of the present disclosure recognize that advances in computational efficiency have permitted for more demanding resource and activity progress tracking. Such progress tracking can now digitally monitor various forms of complex phenomena, ranging from sophisticated new business formation initiatives, merger, acquisition and divestiture activity, or interpersonal reflection relating to thoughts, opinions, or other perspectives, including allocation of a limited resource, such as time, as introduced above.

Referring now to FIG. 1, an exemplary embodiment of apparatus 100 for determining an instruction set as described earlier, e.g., for an entity such as a startup business, is provided. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 140, which may include a memory, such as a main memory and/or a static memory, as discussed further in this disclosure below. Computing device 104 may include a display component (e.g., display device 132, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included or together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, described processes are executed by computing device 104 having a processor and a memory communicatively connected to the processor. As used in this disclosure, "communicatively connected" means connected by way of a connection, attachment or linkage between two or more relate which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, computing device 104 is configured to receive a plurality of datasets 108 from a user device. A "user device," for the purpose of this disclosure, is any additional computing device used by user to access and/or interact with computing device 104, such as, without limitation, a mobile device, laptop, desktop computer, or the like. As used in this disclosure, each "dataset" of the plurality of datasets 108 describes a plurality of actions performed by an entity. As used in this disclosure, an "entity" is an independent and distinct existence such as a legal person. In some cases, legal person may include, without limitation, individual, group of individuals, trust, foundation, partnership, limited partnership, corporation, other business entity or firm, or the like thereof. In other cases, legal person may further include government such as, without limitation, municipality, state government, provincial government, departmental government, national or federal government, quasi-governmental organization, and/or the like thereof. In some embodiments, entity may include one or more sub-entities such as, without limitation, departments or divisions of entities described above. In a non-limiting example, entity may include a startup founded by an entrepreneur or group of entrepreneurs as generally described above. In a non-limiting example, actions may describe an initial state of mind of the entrepreneur, such as a mindset, or other psychological, financial, strategic and the like viewpoint, such as selective targeting of certain customers based on their respective consumption preferences. Accordingly, such actions may describe, for example, intake of customer-completed surveys indicative of product preferences, such as services training, or goods delivered on a timed basis, such as monthly, and corresponding order fulfillment efforts undertaken on behalf of the seller. In addition, outside of business development efforts alone, plurality of actions described herein may include data indicative of athletic performance, such as, without limitation, for professional athletes including football, tennis, soccer, golf, and other sports players. In such a context, plurality of dataset 108 may include training schedules, nutritional supplement intake patterns, daily hydration and nutrition information, rest days, and the like.

In addition, the memory contains instructions configuring the processor to generate an "interface data structure" including an input field based on ranking the first transfer datum and the second transfer datum. An "interface data structure," as used in this disclosure, is an example of data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

Therefore, "interface data structure," as used herein, refers to, for example, a data organization format used to digitally request a data result or action on the data. In addition, the "interface data structure" can be displayed on a display device, such as a digital peripheral, smartphone, or other similar device, etc. The interface data structure may be generated based on received "user data," defined as including historical data of the user. Historical data may include attributes and facts about a user that are already publicly known or otherwise available, such as prior time allocations spent on certain activity patterns, such as leisure, education, income-generation, etc. In some embodiments, interface data structure prompts may be generated by a machine-learning model. As a non-limiting example, the machine-learning model may receive user data and output interface data structure queries.

Accordingly, as used herein, the processor may generate an interface data structure including an input field. More particularly, the interface data structure configures a remote display device to display the input field and receive a user-input datum into the input field. The user-input datum describes data for updating subject process 116, such as to update progress made by the entity in relation to viewing and acting in response to receipt of earlier iterations of the instruction set. Accordingly, the remote display device may display the instruction set calculated for a current iteration as including displaying an updated subject process 116 based on the user-input datum.

With continued reference to FIG. 1, each dataset of plurality of datasets 108 may describe a sequence of actions containing one or more activity patterns. "Activity patterns," as used herein, refers to sets of default values for various fields relative to an activity, such as description, subject, and priority, wherein default values are represented using binary patterns, e.g., sequences of "1s" and "0s" that may be organized and reorganized digitally by computing device 104 to represent text. In a non-limiting example, in the context of new business initiation and growth, activity patterns for activity such as entity initiation and growth may include a plurality of stages of business growth or development, which may include (at a minimum): (1) existence; (2) survival; (3) success; (4) take-off; and (5) resource maturity.

Still referring to FIG. 1, in an embodiment, plurality of dataset 108 may include one or more datasets describing sequences of actions performed by entity at existence stage. In a non-limiting example, in existence stage, actions performed by entity e.g., a company, may include, company owner managing the operations or performs all important operating activities. More particularly, at this point, in the absence of investors, company owner may be the person supporting (e.g., funding) the entire entity; therefore, such dataset may include data related to formal planning of entity establishment such as profit forecasting for the company is at a bare minimum. In another non-limiting example, datasets describing sequences of actions performed by entity at existence stage may also include data related to entity performing market research and/or creating a business plans.

Still referring to FIG. 1, additionally, or alternatively, sequences of actions performed by entity (i.e., business who are successful in introducing their products and/or services) at existence stage may include entity expansion e.g., modifying or improving products to match customer feedback, increasing production, developing more products, or breaking into another market to increase their customer base. In such an embodiment, datasets describing such sequences of actions may also capture progress of entity expansion.

Still referring to FIG. 1, in another embodiment, plurality of dataset 108 may include one or more datasets describing sequence of actions performed by entity at survival stage (i.e., the business may have proven that it is a viable brand). In some cases, entity at survival stage may be associated with a plurality of sub-entities; for instance, and without limitation, entity may found a market for its products or services and has acquired customers (i.e., sub-entities). In a non-limiting example, datasets and actions, including activity patterns, described herein, may relate to business behaviors. Additionally, or alternatively, data within such datasets may include common occurrences that relate to the fact that at least some companies expect not to make much, if any, profit in the first few years of operation, but they should at least break even and generate enough revenue to cover expenses and replace capital assets as they wear out. The alternative is running out of money, with the result being either selling the company or selling its assets.

Still referring to FIG. 1, in another embodiment, plurality of datasets 108 may include one or more datasets describing sequence of actions performed by entity at success stage (i.e., a maturity phase, where the entity is thriving). In a non-limiting example, entities (e.g., businesses) may have established a strong presence in one or more industries to ensure consistent profits; for instance, and without limitation, businesses may have the brand recognition and size to be financially healthy. In a non-limiting example, datasets and actions, including activity patterns, described herein may be related to existing accounting practices, marketing plans, production systems, among others.

Still referring to FIG. 1, in another embodiment, plurality of datasets 108 may include one or more datasets describing sequence of actions performed by entity at take-off stage (i.e., entity has achieved rapid growth). In a non-limiting example, described datasets, actions, and activity patterns, described herein, may related to a resolutions of inefficiency issues (e.g., management of financial gains from previous stage) that come with rapid growth of entity. Data within such dataset may describe the longevity of entity; for instance, and without limitation, information related to sub-entities (e.g., staff), financial resources, developed business models, among others.

With continued reference to FIG. 1, in some cases, plurality of datasets 108 may be input into computing device 104 manually by entity, for example, and without limitation, a client who may be associated with any type or form of establishment (e.g., a business, university, non-profit, charity, etc.). In another example, entity may be an independent entity (e.g., a solo proprietor, an athlete, an artist, etc.). In some cases, plurality of datasets 108 may be extracted from an entity profile, wherein the "entity profile," as described herein, is a structured representation or collection of attributes that describes entity within a system or domain. In a non-limiting example, entity profile may include a business profile, wherein the business profile may be available via one or more third-party platforms such as business and employment-focused social media platform e.g., LINKEDIN. More particularly, such entity profile may include an attribute describing one or more past (business, financial, personal, among others) achievements of an entity. Persons skilled in the art, upon reviewing the entirety of this disclosure, will be aware of various other ways or situations in which plurality of datasets 108 may be input, generated, or extracted by computing device 104 described herein. For example, and without limitation, plurality of datasets 108 may be extracted from or otherwise be based on the client's business profile containing various business records such as financial records, inventory record, sales records, and the like. Additionally, or alternatively, in one or more embodiments, datasets 108 may be generated by evaluating interactions with sub-entities and/or external entities, such as customers, suppliers, third-party entities, among others.

In a non-limiting example, and still referring to FIG. 1, plurality of datasets 108 may be generated and/or inputted by external entity (or third party) that evaluates entity described herein such as credit rating agency, financial institutions, government regulatory agencies, industry analyst, independent auditors, investors and shareholders, among others. In some instances, external entity may also include, without limitation, business strategy consulting, legal, or other related ancillary professional services, such as accounting, provided on a time-based basis, such as hourly, may be assessed for effectiveness in the aggregate based on such third-party assessments. For example, and without limitation, plurality of datasets 108 may include a data element describing a numeric measurement on a quantifiable attributes of described entity such as a rating (either positive or negative) indicating a combination of a company's in-house legal counsel and outside law firm counsel are collectively achieving business objectives in a timely and favorable manner as viewed by investors and/or the public stock markets in general.

With continued reference to FIG. 1, in some embodiments, plurality of datasets 108 may be obtained using optical character recognition (OCR). As a non-limiting example, plurality of datasets 108 may be obtained by analyzing one or more documents related to described entity. For the purposes of this disclosure, "document" is a recorded piece of information. In some cases, documents may be provided or generated by external entities listed above. As a non-limiting example, documents may include a budgeting spreadsheet of an entity's finances, bank statement, tax return, legal documents, business report, and the like. In some cases, plurality of datasets 108 including one or more documents described herein may be stored in and/or retrieved from database as described below. In other cases, plurality of datasets 108 including one or more documents described herein may be received from user device as described above.

With continued reference to FIG. 1, for the purposes of this disclosure, an "optical character recognition" is a technology that enables the recognition and conversion of printed or written text into machine-encoded text. In some cases, OCR may include automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of plurality of datasets 108. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to each dataset of plurality of datasets 108 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 4. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes provider data 112 or user data 136. Since the adaptive classifier may have learned something useful a little too late to recognize characters on the first pass, a second pass may be run over the provider data 112 or user data 136. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in one or more embodiments, plurality of datasets 108 may be acquired using web trackers or data scrapers. As used herein, "web trackers" are scripts (e.g., programs or sequences of instructions that are interpreted or carried out by another program rather than by a computer) on websites designed to derive data points about user preferences and identify. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, datasets 108 may be numerically quantified (e.g., by data describing discrete real integer values, such as 1, 2, 3 . . . n, where n=a user-defined or prior programmed maximum value entry, such as 10, where lower values denote lesser significance relating to favorable business operation and higher values denote greater significance relating to favorable business operation). For example, for classifying an element describing an activity pattern of datasets 108 (e.g., of a business) to subject process 116 in the context of fiscal integrity in financial services and retirement planning, datasets 108 may equal "3" for a business, such as an investment bank stock or mutual fund share, etc., suffering from credit liquidity problems stemming from a rapidly deteriorating macroeconomic environment and/or poor quality senior management, a "5" for only matching industry peers, and an "8" for significantly outperforming industry peers, and the like. Additionally, or alternatively, plurality of datasets 108 may be described by data organized in or represented by lattices, grids, vectors, etc., and may be adjusted or selected as necessary to accommodate entity-defined circumstances or any other format or structure for use as a calculative value that a person skilled in the art would recognize as suitable upon review of the entirety of this disclosure.

With continued reference to FIG. 1, a "vector" as defined in this disclosure is a data structure that represents one or more a quantitative values and/or measures [of whatever you are making the vector for]. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

Still referring to FIG. 1, in some embodiments, plurality of datasets 108 may be provided to or received by computing device 104 using various means. In one or more embodiments, datasets 108 may be manually provided to computing device 104 by an entity, such as by a human authorized to act on behalf of the entity including any type of executive officer, an authorized data entry specialist or other type of related professional, or other authorized person or digital entity (e.g., software package communicatively coupled with a database storing relevant information) that is interested in improving and/or optimizing performance of the system, or in a particular area or field over a defined duration, such as a quarter or six months. In a non-limiting example, a human may manually enter each dataset of plurality of datasets 108 into computing device 104 using, for example, a user input field 148 of graphical user interface (GUI) 136 of display device 132. A "graphical user interface," as used herein, is a graphical form of user interface that allows users to interact with display device 132. A "display device," as used herein, is a hardware component that presents visual information or output to the user. In some cases, display device 132 may include, without limitation, liquid crystal display (LCD), a light-emitting diode (LED), organic light-emitting diode (OLED), plasma, projection, touch screen, and/or the like. As used in this disclosure, a "user input field" is a graphical or interactive element in GUI 136 that allows users (e.g., entities) to input or enter data. In some cases, user input field 148 may be configured to receive user input containing data within plurality of datasets 108 or capture information from plurality of datasets 108 provided by the user. In a non-limiting example, user input field 148 may include a text box, a dropdown menu, a checkbox, a radio button, and/or any other interactive components that allows entities to provide plurality of datasets 108. In some cases, user input field 148 may include an event handler that respond to user interactions, wherein the "event handler," for the purpose of this disclosure, is a piece of computer program or software function that is associated with a specific event, such as entity submitting plurality of datasets 108 by interacting with corresponding user input field.

In a non-limiting example, and still referring to FIG. 1, and without limitation, a human may use display device 132 to navigate the GUI 136 and provide plurality of datasets 108 to computing device 104 through user input field 148 displayed on GUI 136 using input devices. Non-limiting exemplary input devices include keyboards, joy sticks, light pens, tracker balls, scanners, tablets, microphones, mouses, switches, buttons, sliders, touchscreens, and the like. In other embodiments, plurality of datasets 108 may be provided to computing device 104 by a database over a network from, for example, a network-based platform. Plurality of datasets 108 may be stored, in one or more embodiments, in database 150 and communicated to computing device 104 upon a retrieval request from a human and/or other digital device such as user device communicatively connected with computing device 104. In other embodiments, plurality of datasets 108 may be communicated from a third-party application, such as from a third-party application on a third-party server, using a network. For example, and without limitation, plurality of datasets 108 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract plurality of datasets 108 from an accumulation of information provided by database 150. For instance, and without limitation, computing device 104 may extract needed information database 150 regarding improvement in a particular area sought-after by the business and avoid taking any information determined to be unnecessary. This may be performed by computing device 104 using a machine-learning model, which is described in this disclosure further below.

With continued reference to FIG. 1, database 150 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

with continued reference to FIG. 1, at a high-level, "machine-learning" describes a field of inquiry devoted to understanding and building methods that "learn"—that is, methods that leverage data to improve performance on some set of defined tasks. Machine-learning algorithms may build a machine-learning model based on sample data, known as "training data" or a "training set" (described further below in this disclosure) to make predictions or decisions without being explicitly programmed to do so. Such algorithms may function by making data-driven predictions or decisions by building a mathematical model from input data. This input data used to build the machine-learning model may be divided into multiple data sets. In one or more embodiments, three data sets may be used in different stages of the creation of the machine-learning model: training, validation, and test sets.

With continued reference to FIG. 1, described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of user attribute data 154 relating to attributes of the user. In the described example of datasets 108 relating to a business, user attribute data 154 may describe one or more elements, datum, data and/or attributes relating to client engagement with services provided by the user. For example, a business may require financing to launch and can approach a bank (e.g., a type of user) for one or more types of loans. In this example, user attribute data 154 may describe or relate to data describing retail, regional, or even investment banks. In addition, user attributes may include data describing liquidity available to customers (e.g., clients) and performance of outstanding loans and other products. In addition, datasets 108 may include data describing a pattern of activity or conduct undertaken by the client regarding acquisition of goods or services from the user, depending on, for example, repayment behavior of the client to the user for services rendered by the user to the client. In banking, which may mean that the client will assess risk in relatively difficult macroeconomic conditions as dictated by higher-than-average federal interest rates, etc.

With continued reference to FIG. 1, computing device 104 is configured to generate, for each dataset of plurality of datasets 108, a cluster." As used herein and in the fields of computer science and model-based cluster analysis within data science and other ancillary fields, "outliers" are observations in a (data) cluster with minimal membership proportion or for which the cluster-specific variance with and without the observation is very different. That is, alternatively put, outliers are data points that are significantly different from the rest of aa dataset. They can be relatively abnormal observations that skew data distribution, and arise due to inconsistent data entry, or erroneous observations. As used in this disclosure, an "outlier cluster" is an attribute cluster with an impact metric that differs substantially from a population average. In some embodiments, outlier cluster 140 represents a measure of skill or competence. In a non-limiting example, outlier cluster 140 may represent a function an entity is more skilled at than another entity or than an average entity. In some embodiments, each dataset of plurality of datasets 108 may include an impact metric and outlier cluster 112 may be generated as a function of the impact metric. As used herein, an "impact metric" is a measure of the degree to which one or more data elements of a dataset supports a corresponding subject process 116 as described above. In a non-limiting example, outlier cluster 112, impact metric, and method to determining/generating outlier cluster 112 using impact metric may be consistent with any outlier cluster, impact metric and processing steps as described in U.S. patent Ser. No. 18/141,296, filed on Apr. 28, 2023, titled "SYSTEMS AND METHODS FOR DATA STRUCTURE GENERATION," which entirety is incorporated herein by reference.

Still referring to FIG. 1, in some cases, computing device 104 may perform an outlier detection and clustering analysis on plurality of datasets 108, An "outlier detection and clustering analysis," as used herein, are two highly related tasks, including: (1) "clustering", which is finding most patterns in a data set and organizing the data accordingly, and (2), "outlier detection", which captures exceptional cases that deviate substantially from most patterns in the data set. Here, such exceptional cases can describe optimal or target phenomena. That is, for each "subject process" as described earlier, such as a header or label indicated as "mindset is everything," subject process 116 may describe data indicative of phenomena or occurrences starting off at an initial undesirable point and later progressing upon the user of the described processes receiving feedback in the form of the instruction set to better levels of performance. For example, and without limitation, as shown by display screen 200D of FIG. 2D, within the "quantifying your experience" label, subject process 116 may initially describe a negative outlook for an example entity, such as a startup business within its first few years subsequent to inception, that "understanding of customer expectations declines year-on-year" at first label 204D. Accordingly, described processes may generate the instruction set for display to the entity for the entity to adjust its conduct such that, at a later assessment point in time, the subject process 116 is updated to describe progression from the first label, "mindset is everything," and first label 204D to a second label, "who you're looking for is you" and second label 208D, indicating that the entity is now "able to successfully engage with unpleasant people." This progression from first label 204D to second label 208D is reflective of approaching the "outlier cluster" for "who you're looking for is you," denoted as "you create each new scorecard to identify those individuals in every situation who will be the most like-minded and cooperative."

In a non-limiting example, and still referring to FIG. 1, computing device 104 may be configured to receive an element of outlier cluster 112 e.g., an outlier, wherein the outliers may include a data point that are significantly different from the rest of the dataset of plurality of datasets 108. In some cases, outlier may include a relatively abnormal observation that skew data distribution within each dataset of plurality of datasets 108, and may arise due to inconsistent data entry, or erroneous observations; therefore, outlier cluster 112 may be used to describe optimal performance levels of described entity, such as for each mindset type 1 through 8 (shown vertically) and scoring 1 through 12 (shown horizontally) as depicted in display screen 200D of FIG. 2D. That is, scoring levels 10-12 correspond with text generated by outlier cluster 112 for each mindset type 1 through 8.

With continued reference to FIG. 1, in some cases, computing device 104 may be configured to generate outlier cluster 112 for each dataset of plurality of datasets 108 using the silhouette method. As used in this disclosure, "silhouette method" is a technique used in clustering analysis to evaluate quality of clustering result. In some cases, silhouette method may provide a measure of how well each data element of each dataset of plurality of datasets 108 fits into an assigned cluster, indicating a compactness and separation of clusters. The silhouette method may compute silhouette coefficients of each data element within each dataset of plurality of dataset 108 that measure how much each data element is like its own cluster compared to other clusters by providing a succinct graphical representation of how well each data element has been classified. The analysis of these graphical representations may be called "silhouette analysis." In an embodiment, Computing device 104 may be configured to aggregate data included in each dataset of plurality of datasets 108 and determine a quality score for the aggregates, wherein the "quality score," as described herein, refers to a measure or metric that assesses the quality or validity of a clustering result. In a non-limiting example, computing device 104 may be configured to determine quality score as a function of a plurality of silhouette coefficients, ranges from −1 to 1, that measures an average cohesion and separation of data elements within and between each dataset of plurality of datasets 108. In some cases, higher value of quality score may indicate better-defined clusters.

Still referring to FIG. 1, computing silhouette coefficient may require a plurality of ($N^2$) pairwise distances, wherein each pairwise distance refers to a distance between all data points within a given dataset ($C_I$): $i \in C_I$. Computing device 104 may be configured to compute a mean distance $a(i)$ between data point i and all other data points in dataset $C_i$ using following equation:

$$a(i) = \frac{1}{|C_I| - 1} \sum_{j \in C_I, i \neq j}^{n} d(i, j),$$

wherein $|C_I|$ is the number of data points belonging to dataset $C_I$ and $d(i,j)$ is the distance between a first data point i and a second data point j in dataset $C_I$. In some cases, mean distance $a(i)$ may measure how well i is assigned to its cluster (i.e., smaller the value, the better the assignment). Computing device 104 may then be configured to compute a mean dissimilarity b of data point i to a second dataset $C_j$ as the mean of distance from data point i to all other data points in $C_j$ using following equation:

$$b(i) = \min_{J \neq I} \frac{1}{|C_J|} \sum_{j \in C_J} d(i, j),$$

where $C_j \neq C_l$. In some cases, second dataset $C_j$ with smallest mean dissimilarity b may said to be the "neighboring cluster" of dataset $C_l$ because it is the next best fit cluster each data point within the dataset. Quality score e.g., silhouette value/coefficient may then be determined, by computing device 104, using following equation:

$$s(i) = \frac{b(i) - a(i)}{\max\{a(i), b(i)\}},$$

if and only if $|C_l|$ is greater than 1. In some cases silhouette coefficient may be 0 if $|C_l|$ is equal to 1. Optimal number of clusters may be determined by iteratively performing a clustering process e.g., k-medoids or k-means, for different values of K (i.e., number of clusters) and calculate silhouette coefficient for each solution. In some cases, the value of K that yields the highest silhouette coefficient may be considered as the optimal number of clusters. Additionally, or alternatively, computing device 104 may be configured to display a silhouette plot via GUI 136 using display device 132 described above, wherein the silhouette plot may present a measure of how close each data point in one dataset is to data points in the neighboring dataset and thus provides a way to assess parameters like the number of clusters K visually. Other exemplary quality score may include, without limitation, Dunn index, Davies-Bouldin Index, Calinski-Harabasz Index, and the like. Persons skilled in the art, upon reviewing the entirety of this disclosure, will be aware of various ways in which quality score for each database of plurality of datasets 108 may be determined, calculated, and assigned by computing device 104 described herein, consistently with this disclosure With continued reference to FIG. 1, in an embodiment, clustering process iteratively performed by computing device 104 during quality score determination may include generating a first vector output containing a data entry cluster, generating a second vector output containing an input data, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In a non-limiting example, and still referring to FIG. 1, outlier clusters 112 generated by computing device 104 for plurality of datasets 108 may include data deviate significantly from plurality of datasets 108. In some cases, self-similarity of each dataset of plurality of datasets 108, including outlier cluster 112 may allow entity to distinguish between clusters that exhibit similar actions, user attributes, activity patterns, among similar characteristics and/or those that are dissimilar. For example, and without limitation, by determining which dataset are most self-similar within plurality of datasets 108, entity may gain insights into the underlying structure and patterns within plurality of datasets 108. Such insights may be valuable for certain actions such as decision-making processes, as it enables entity to group similar data points together and identify distinct clusters with unique attributes or properties (i.e., dissimilar data points). In a business-related context, the use of quality scores and cluster analysis described herein may align with process such as, without limitation, establishing measurable standards and mindsets that help entity to transform from one stage to another stage, for example, survive stage to success stage as described above. Such usage of quality scores and cluster analysis described herein may provide a quantitative framework for evaluating and measuring one or more aspects of entity e.g., business. For instance, and without limitation, by applying quality score such as silhouette coefficient or other quality measures to plurality of datasets, entity may be able to transform qualitative experiences into quantitative stands and measurements. Processes described herein may be used to enhance personal confidence, performance, and results by incorporating quantitative stands and measurements into entity's marketplace approach, thereby demonstrating commitment to excellence and attract long-term relationships with external entities and/or sub-entities, e.g., prospective clients, customers, and team members.

Still referring to FIG. 1, as a result, in one or more embodiments, computing device 104 may be configured to generate, for each dataset of datasets 108 (e.g., where each dataset of datasets 108 describes multiple actions performed by the entity as described earlier), outlier cluster 112, which may describe data used for subsequent processing as described above. Generating the outlier cluster includes aggregating data included in a dataset of datasets 108. Data aggregation is the process of summarizing a large pool of data for high level analysis. At its most basic level, it involves compiling information from a range of prescribed databases and organizing it into a simpler, easy-to-use medium, usually utilizing sum, average, mean, or median references. Generally, there two primary types of data aggregation include: (1) time aggregation; and (2) spatial aggregation, where time aggregation involves gathering all data points for one resource over a specific time and spatial aggregation consists of collecting all data points for a group of resources over the same specific time. Processes described herein may use either time or spatial aggregation to achieve different process needs. Generating the outlier cluster also includes identifying data within aggregated data based on similarity and matching some or all the plurality of actions to a "threshold value" (e.g., threshold value 124), which, as used herein and in the fields of computer science and data science, may refer to a numerical value, stored digitally in computing device 104, which governs the choice to turn a projected probability or scores into a class label. For example, for normalized projected probabilities in the range of 0 to 1, the threshold value may be set to 0.5 by default. Here, the threshold value may describe data reflecting an intermediary performance assessment or narrative, as shown by display screen 200D, such as "unfamiliar regarding how to adapt to changing industry and marketplace trends.

still referring to FIG. 1, generating the outlier cluster includes assigning a quality score for at least some identified data (e.g., within the aggregated data) based on assessing whether identified data exceeds threshold value 124. Outlier cluster 112 may be determined based on the quality score. That is, data describing "you create a new scorecard to identify individuals in every situation who will be most like-minded and cooperative" as shown in display screen 200D may be identified by the described processes as outlier cluster 112 as it exceeds threshold value 124. Processor 144 may receive from the user device, subject process 116 describing "a current state of the entity" associated with the user device. As used in this disclosure, a "current state of the entity" includes data describing the entity at a discrete point in time, such as at the initiation of a new quarter. As a result, incremental changes in measured phenomena, such as sales, can be tracked over time.

With continued reference to FIG. 1, as used in this disclosure, "subject processes", are indicative of various forms of phenomena, including general business strategy, or specific initiatives taken by up-and-coming entrepreneurs directed to establishing and growing newly formed businesses to thriving enterprises having reliable cash flow and customer bases. Instruction set in generated by the described processes may first digitally consider, by intaking data describing psychological surrounding conditions of the entrepreneur, such as descriptors including catchphrases such as "mindset is everything," "quantifying your experience," "screening and attracting," etc. The instruction set then incrementally provides step-by-step instructions, in textual format output by a display device such as a touch screen of a smartphone, for the entrepreneur to systematically change and improve certain aspects and behaviors relating to running their startup in question to approach an optimal condition, which may be represented digitally by outlier cluster 112, which may relate to corresponding aspects of startup or other business performance, such as, for example, sales, marketing, employee performance management and retention, etc.

with continued reference to FIG. 1, computing device 104 is configured to identify, for each outlier cluster 112, a "process modification model." As used herein, the process modification model describes a set of actions to be performed to increase proximity of subject process 116 to each outlier cluster. "Proximity," as used herein and in the fields of computer science and data science, include measurements using mathematical techniques that calculate the similarity or dissimilarity of data points. Generally, proximity can be measured in terms of similarity or dissimilarity, e.g., how alike objects are to one another. Here, increasing proximity of subject process 116 describing activities performed by the entity to outlier cluster 112, e.g., such as multiple occurrences of outlier cluster 112 corresponding to each dataset of datasets 108, may involve progressively monitoring performance improvement of the entity over time as it seeks to approach optimal performance.

That is, as shown by display screen 200D, in the "screening and attracting" mindset, initial subject process 116 data may describe conditions relating to "recent working with unpleasant colleagues but continue due to financial necessity." Described processes may generate instruction set 224B instructing the entity to incrementally adjust and improve its conduct over time such that subsequent descriptors demonstrate improvement approaching outlier cluster 112 for at least that mindset category. For example, in the example provided here for the "screening and attracting" mindset, improvement may result such that, for the entity, later subject process 116 data may indicate that the entity now "recognizes that only searching for like-minded people will result in missing out on some business opportunities" to progress towards the outlier cluster 112 for that mindset category, identified as "accelerating the process of screening out those who aren't optimum maximizers and attracting those who are."

Additionally, or alternatively, and still referring to FIG. 1, process modification model may also establish one or more algorithmic standards for the future conduct of the entity. As used in this disclosure, an "algorithmic standard" refers to a set of rules or guidelines established by the process modification model based on outlier cluster 112 of each data set as described herein. In an embodiment, each algorithmic standard may provide a structured approach to how entity (e.g., business process, machine, software) should ideally operate in future scenarios. In some cases, algorithmic standard may be derived, by processor 144, from various patterns and/or trends discovered in outlier cluster 112, taking into account historical performance, present state, or even potential future conditions of entity. Processor 144 may align entity's operation with one or more algorithmic standards to maximize efficiency, productivity, or even any other defined key performance indicators (KPIs). In a non-limiting example, such algorithmic standards established by process modification model may be manifest as specific thresholds for operational parameters, structured procedures for handling certain situations, or guidelines for decision-making processes. In some cases, algorithmic standards may be implemented automatically or semi-automatically, reducing the need for human intervention and subjectivity, and improving consistency and predictability in the entity's conduct. In a non-limiting example, algorithmic standards generated by process modification model may provide a baseline for ideal operational conditions, with intention of reducing the variance between the present state of the entity and this optimal condition.

In one or more embodiments, and still referring to FIG. 1, process modification model may also provide a decision-making framework, promoting a mindset that empowers entity to understand underpinnings of prescribed actions to be performed to increase proximity of the subject process to outlier cluster 112. In some cases, decision-making framework may be configured to guide entity in understanding the logic and reasoning behind the set of actions. In an embodiment, the decision-making framework is designed to promote an insightful mindset, for instance, and without limitation, decision-making framework may operate as a cognitive tool designed to help entity decipher the underlying patterns in outlier cluster 112 and translate them into actionable steps. In a non-limiting example, process modification model may extend beyond merely suggesting actions described herein; process modification model may equip entity (e.g., users) with the understanding necessary to independently ascertain optimal future choices, cultivating a capacity for anticipatory decision-making. Such decision-making framework may leverage one or more algorithmic standards generated by process modification model as described herein. In a non-limiting example, algorithmic standards may include definition of certain actions that should be triggered based on specific conditions setting up priority levels among different actions or determining the sequence of actions in a complex process. Decision-making framework may evolve based on the ongoing assessment of the entity's actions and/or quality scores assigned as described above. Additionally, or alternatively, decision-making framework may also take into account both the successes and failures in aligning subject process 116 with outlier cluster 112 and refine one or more algorithmic standards, and by extension, the decision-making framework itself, ensuring a continuous cycle of improvement and optimization.

Still referring to FIG. 1, in other embodiments, process modification model may render one or more business segments quantifiable. In some cases, the assigned quality score, contingent on whether the identified data set surpasses a defined threshold value, may facilitates measurable evaluation for each phase in subject process 116, allowing not only for performance assessment but also for the prediction and readiness for potential future scenarios. Such quantifiable granularity may enhance operational efficiency, precision, and productivity across one or more business segments. In a non-limiting example, quantifying one or more business segments may include applying process modification model, considering the actions performed by entity as detailed in plurality of datasets received by processor 144. Each action or operation may be associated with specific data points that represent its performance, outcomes, or other relevant parameters.

Still referring to FIG. 1, processor 144 may accordingly generate an interface data structure including input field 220A, alternatively also denoted as user input field 148 that may be displayed by GUI 136 of display device 132. More particularly, in one or more embodiments, the interface data structure configures display device 132 to display input field 220A to receive user-input datum 224A into the input field, where user-input datum 224A describes data for updating subject process 116 and thereby display instruction set 224B including displaying an updated subject process 116 based on the user-input datum. That is, a human user of the user device may manually input, through a touchscreen-sensitive interface of the user device, user-input datum 224A indicative of progress to thereby permit the described processes to iteratively calculate and recalculate the instruction set.

Figures 2A, 2B:
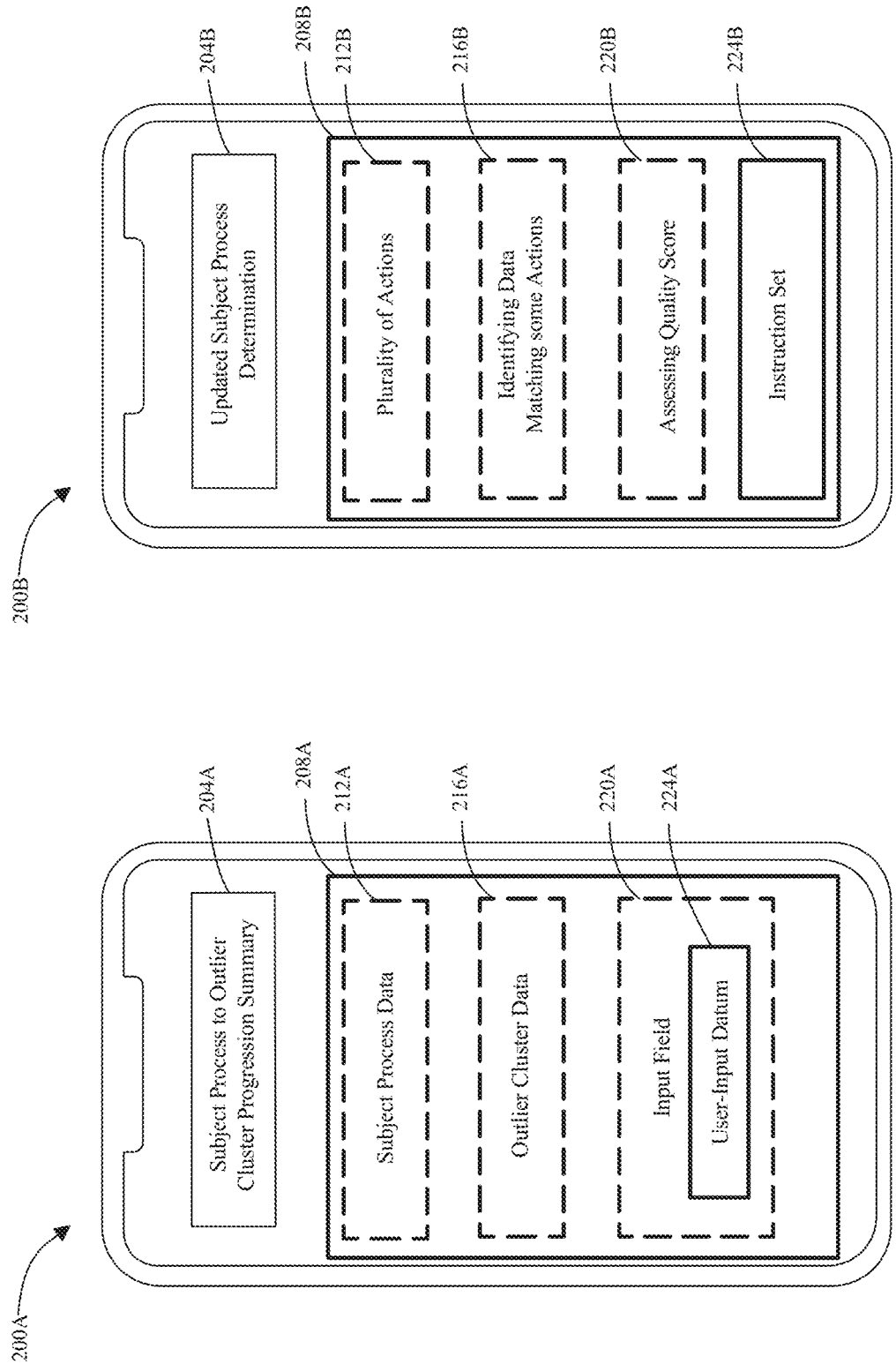
FIGS. 2A-2B are diagrammatic representations of multiple exemplary embodiments of output generated by an interface data structure.

Referring now to FIGS. 2A-2B, exemplary embodiments of user input field 148 as configured to be displayed by GUI 136 of display device 132 based on an interface data structure are illustrated. As defined earlier, an "interface data structure" refers to, for example, a data organization format used to digitally request a data result or action on the data (e.g., stored in a database). In one or more embodiments, each output screen 200A-200B may be an example of an output screen configured to be displayed by display device 132 of FIG. 1 by the described interface data structure. That is, more particularly, the described interface data structure may configure display device 132 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 148 and/or GUI 136 as displayed by display device 132, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208 including progression summary field 204A, client resource data field 212A, prioritization data field 216A, user-input field 220A, which may include one or more instances of user-input datum 224A describing data for selecting a preferred attribute of any one or more repayment behaviors associated with one or more instances of datasets 108.

In addition, in one or more embodiments, user-input datum 224A may be reflective of and/or provide a basis for user attribute data 154. Persons skilled in the art, upon reviewing the entirety of this disclosure, will be aware of various ways in which fewer or additional interactive user input fields may be displayed by screen 208A. Progression summary field 204A may identify described processes performed by processor 144 of computing device 104 by displaying identifying indicia, such as "User Device-Database Interaction Summary" as shown in FIG. 2A to permit, for example, a human to interact with GUI 136 and input information relating to a field of choice (e.g., business operations), through (for example) interactivity provided by progression summary field 204A.

Such information can include data describing activities performed by the business relating to the business achieving its defined goal (e.g., subject process 116 of FIG. 1). In some instances, a human may select from one or more options (not shown in FIG. 2A) relating to prompts provided by progression summary field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, client resource data field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 130 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Instruction Set for User" in process determination field 204B as indicating completion of intake of human-provided input and that described machine-learning processes have completed described classifying processes to output instruction set generation area 208B to the user. For example, in one or more embodiments, instruction set generation area 208B may also include multiple human-interactive fields, including action identification field 212B, data identification field 216B, quality score field 220B, and instruction set 224B generated as described earlier.

Persons skilled in the art, upon reviewing the entirety of this disclosure, will be aware of various ways in which fewer or additional interactive human input fields may be displayed by output screen 200B. Each field within instruction set generation area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in instruction set generation area 208B, but persons skilled in the art will be aware of other example types of feedback, each of which being generated as suitable for a given business by processor 144. In addition, in one or more embodiments, any one or more fields of instruction set generation area 208B may be human-interactive, such as by posing a for the human to provide feedback in the form of input such that described machine-learning processes performed by machine-learning module 130 may intake refined input data and correspondingly process related data and provide instruction set generation area 208B. In some embodiments, such processes may be performed iteratively, thereby allowing for ongoing refinement, redirection, and optimization of instruction set generation area 208B to better meet the needs of the client or user.

Figure 2C:
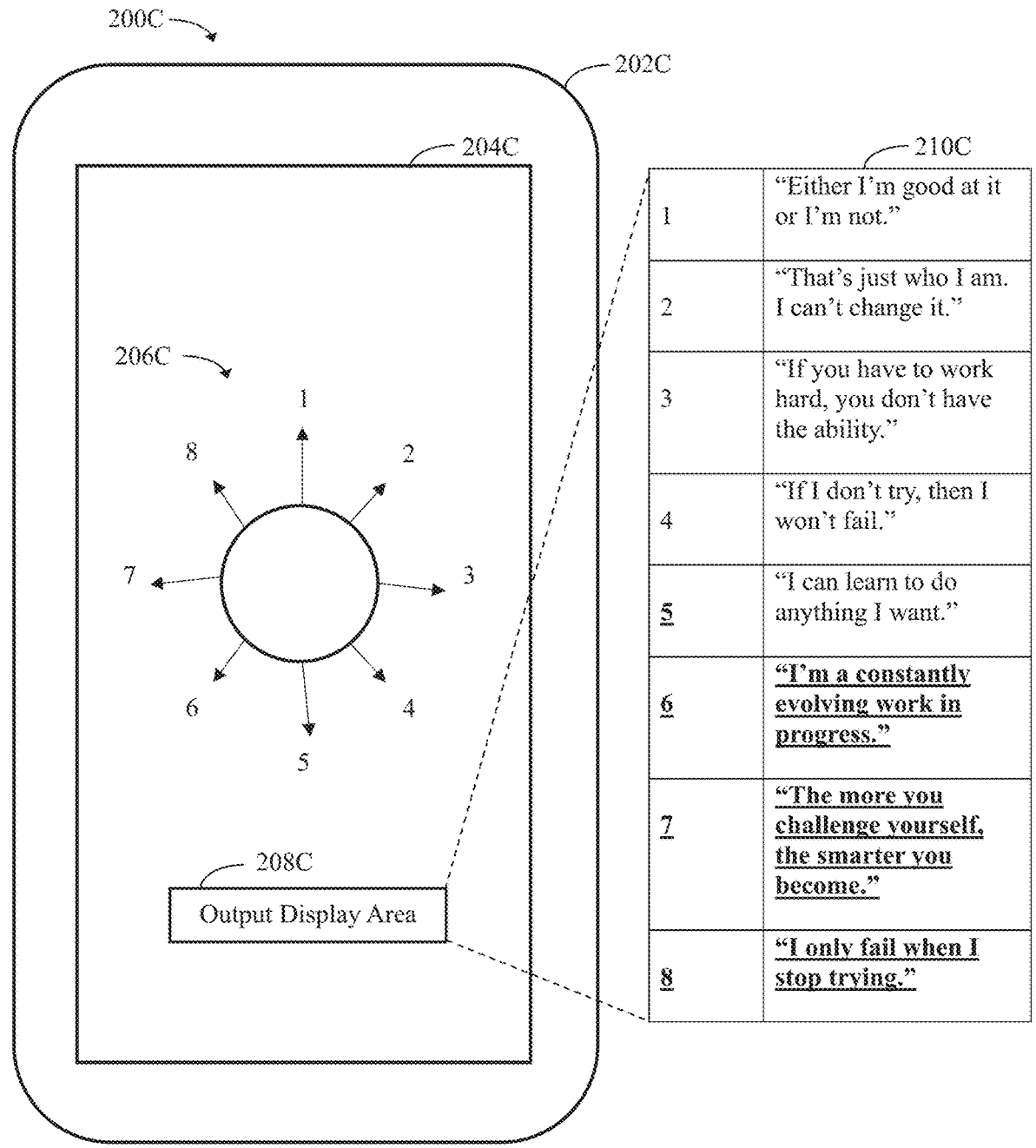
FIG. 2C is an example interactive display screen generated by the interface data structure of FIGS. 2A-2B.

Referring now to FIG. 2C, display screen 204 is shown displayed by display device 202C, which may be one example of display device 132 of FIG. 1 and/or the user device as discussed earlier. Display screen 204, responsive to any one or more of the described processes, may display indicia 206C, which may be in the form of a sundial having incrementally numbered rays. Each ray, in this example, corresponds to an initial categorization indicative of data representative of some type of sequential phenomena, such as activities related to the running of a new business entity such as a startup, and the associated mental state with such phenomena. For example, a disheartened entrepreneur may input data into computing device and/or display device 202C indicating data to be output in output display area 208C, such as "either I'm good at it or I'm not," where such output may correspond with, or alternatively be, example first category 204C, example 208D and the like shown in display screen 200D of FIG. 2D. As shown in FIG. 2C, iterative recalculation of the instruction set based on user-input datum 224A and may result in the progressive transitioning of output display area 208C from an initial categorization value 210C, e.g., "either I'm good at it or I'm not," to a subsequent categorization value 210C, e.g., "the more you challenge yourself, the smarter you become, etc."

Referring now to FIG. 2D, in some embodiments, generating the interface data structure includes retrieving data describing attributes of a user (e.g., affiliated or otherwise representative of the entity), displaying a representation of first label 204D and second label 208D selected from a plurality of labels in a grid based on retrieved data, and generating the interface data structure based on the data describing attributes of the user. In addition, generating the interface data structure may include determining vector 212D from the representation of first label 204D to second label 208D, and configuring display device 32 to display vector 212D. In one or more embodiments, determining vector 212D from first label 204D to second label 208D further comprises generating vector 212D including an angle value and a distance value, where the angle value and the distance value describe a divergence value between data describing an example subject process 116 and its corresponding threshold value 124.

In some embodiments, determining vector 212D from first label 204D to second label 208D includes organizing some labels, such as those stored in label data 158 of database 150 or label matching database 300, which may be one example of database 150, based on their respective proximity to a minimal output type (e.g., scoring levels 1-3 as listed horizontally in display screen 200D) and a maximum output type (e.g., scoring levels 10-12 as listed horizontally in display screen 200D). Determining vector 212D from first label 204D to second label 208D also includes aggregating multiple instances of first label 204D based on organization; and classifying aggregated first label data to a label having a closest proximity value to the maximum output type.

In addition, in some embodiments, generating subject process 116 may include retrieving data describing current preferences of the user device between a minimum value and a maximum value from database 150, where retrieving data further comprises receiving a form element input into the input field. The "form element," also referred to as a "<form> element" is a container for different types of input elements, such as: text fields, checkboxes, radio buttons, submit buttons, etc. Further, in some embodiments, memory component 140 contains instructions configuring processor 144 to generate an additional input field based on a divergence value, which describes divergence between subject process 116 and each outlier cluster. Still further, in some embodiments, memory component 140 contains instructions configuring processor 144 to evaluate user-input datum 224A comprising classifying one or more new instances of user-input datum 224A to the threshold value, generating a divergence value based on the classification, and displaying the divergence value hierarchically based on magnitude of divergence.

As used herein, and in the field of computer science, a computation is said to diverge if it does not terminate or terminates in an exceptional state. Otherwise, it is said to converge. In domains where computations are expected to be infinite, such as process calculi, a computation is said to diverge if it fails to be productive (e.g., to continue producing an action within a finite amount of time). Here, the datasets 108 describes phenomena dissimilar to the outlier cluster 112, thereby facilitating calculation of the described "divergence" value. In some instances, the interface data structure configures display device 132 to generate an additional input field based on the divergence value, which describes divergence between the first datum and the second datum.

Further, in one or more embodiments, memory component 140 contains instructions configuring the processor to determine a pattern, where the pattern describes user interaction with database 150, classify an element of the pattern to the divergence value; and adjust the pattern based on a magnitude of the divergence value. In addition, or the alternative, memory component 140 contains instructions configuring the processor to classify data describing subject process 116 to the threshold value, determine proximity value of subject process 116 to the threshold value based on classification, and adjust the threshold value to reduce the proximity value. A "pattern," also referred to as "pattern recognition," as used herein and in the fields of computer science and data science, is a part of computational analysis and refers to a process of identifying, patterns in a data set to categorize, process and resolve information more effectively. Patterns are pieces or sequences of data that have one or multiple similarities. Accordingly, processor 144 may classify an element of the pattern to the divergence value, and adjust the pattern based on a "magnitude" of the divergence value. As used herein, and in the fields of computer science and data science, "magnitude," alternatively referred to as "sign magnitude," is defined as follows a number's representation in sign magnitude has the same number of bits as the original number, plus a bit called the sign bit on the extreme left (the MSB). The sign bit denotes that the number is negative if it is set to 1 and the number is positive if it is set to 0. In some embodiments, memory component 140 contains instructions configuring the processor to classify data describing subject process 116 to threshold value 124. Classifying data describes the subject process 116 may include comparing data describing subject process 116 to threshold value 124 and determining a parity value based on comparison of data describing subject process 116 to the threshold value, wherein the parity value is included within the instruction set. As used herein, and the fields of computer science and data science, parity (from the Latin "paritas," meaning equal or equivalent) is analytical technique that checks whether data has been lost or written over when it is moved from one place in storage to another or when it is transmitted between computers. Since data transmission may not be an entirely error-free process, data may not always be received in the same way as it was transmitted. A parity bit adds "checksums," which are small-sized blocks of data derived from another block of digital data for the purpose of detecting errors that may have been introduced during its transmission or storage, into data that enable the target device to determine whether the data was received correctly. An additional binary digit, the parity bit, may be added to a group of bits that are moved together. This bit, sometimes referred to as a check bit, is used only to identify whether the moved bits arrived successfully.

With continued reference to FIG. 1, accordingly, memory component 140 may contain instructions configuring processor 144 to classify datasets 108, outlier cluster 112 to a label selected from label data 158 based at least in part on threshold value 124 as described earlier. "Classification," as used herein and in the fields of computer science and data science, maybe a form of a supervised machine learning method or process that may involve the use of a digital model to predict a correct label of a given input data. In classification, such a model may be first fully trained using training data (to be further described below), prior to evaluation of the trained model on test data before being used to perform prediction on new unseen data. For example, classification may be used to predict whether a given incoming email message is "spam" (automatically generated, undesired by the recipient, etc.)

"Training data," as used herein and in the fields of computer science and data science, is the data used to train or prepare a machine learning algorithm or model to accurately predict a particular outcome, or answer, desired to be predicted by the model. In supervised learning, training data requires a human to participate in iterative machine-learning processes (also referred to as a "loop") to choose and label features in the data that will be used to train the machine-learning model. Unsupervised learning uses unlabeled data to find patterns, such as inferences or clustering of data points. Semi-supervised learning includes a combination of supervised and unsupervised learning.

Classification processes described herein (e.g., such as incorporated and/or executed by the described process modification model) may be performed by computing device 104 or any combination of components, processes and/or features incorporated within or otherwise associated with computing device 104. Those skilled in the art will appreciate that various combinations of software and computing device related hardware may be used to execute the described classification processes without departing from the scope and spirit of the disclosure. More particularly, in one or more embodiments, memory component 140 contains instructions configuring processor to classify, using a machine-learning model (e.g., executed by machine-learning module 130) including classifier 134, datasets 108, outlier cluster 112 and subject process 116 to a label (e.g., such as "mindset is everything", "scoring is exponential," etc. as shown by display screen 200D of FIG. 2D) selected from a plurality of labels (e.g., as may be provided by database 150 and/or label matching database 300) based at least in part on threshold value 124. Classifying may include training the machine-learning model using the classifier with a training data set describing an optimized activity pattern of the user device and predicting adjustments to at least the first activity pattern based on the trained machine-learning model to match the first activity pattern with the optimized activity pattern.

Figure 3:
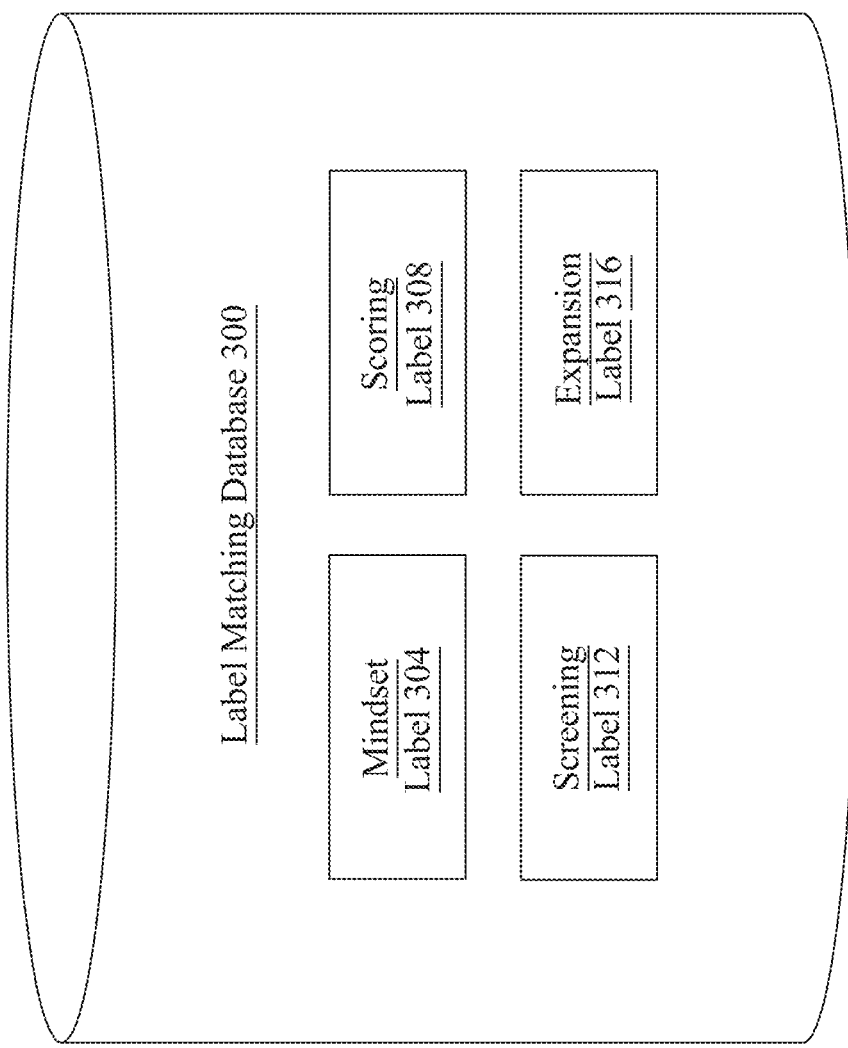
FIG. 3 is a diagrammatic representation of a label matching database.

Referring now to FIG. 3, "labels," as used herein, are datum, elements, or data describing discrete categorizations of activity patterns, such as mindset label 304, scoring label 308, screening label 312, and expansion label 316 of resource allocation database 300. Such labels may be examples of corresponding labels displayed by display screen 200D, such as "mindset is everything, "best/worst starting point, etc.", any one or more of which may be stored within label data 158 of database 150 of FIG. 1. Classification is described further herein and may include predictive modeling involving assigning, by classifier 134, a class label to input examples, using binary classification, which refers to predicting one of two classes, or multi-class classification, which involves predicting one of more than two classes.

Multi-label classification involves predicting one or more classes for each example and imbalanced classification refers to classification tasks where the distribution of examples across the classes is not equal. That is, datasets 108, when describing income-generating activities, may be classified to, for example, scoring label 308 by classifier 134 and/or using outlier cluster 112 and so on, etc. In some embodiments, classifier 134 may further prioritize scoring label 308 or any one type of label or label, such as expansion label 316, over remaining labels should threshold value 124 describe such preferences and/or data of the entity, etc.

Returning now to FIG. 1, described concepts relating to classification of data for determining a resource distribution, can be quantified by one or more elements, datum or data and thereby processed by "machine-learning processes" executed by machine-learning module 130 of computing device 104 to, for example, identify, for each outlier cluster 112, a process modification model, where the process modification model describes a set of actions to be performed to increase proximity of subject process 116 to a corresponding outlier cluster 112. More particularly, and as described further herein with relation to FIG. 4, a "machine-learning process," as used in this disclosure, is a process that automatedly uses training data to generate an algorithm that will be performed by a computing device/module (e.g., computing device 104 of FIG. 1) to produce outputs given data provided as inputs. Any machine-learning process described in this disclosure may be executed by machine-learning module 130 of computing device 104 to manipulate and/or any datum relating to determining an instruction set for the entity.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in each data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

For instance, a supervised learning algorithm (or any other machine-learning algorithm described herein) may include one or more instances of subject process 116 describing confidence of a user as described above as inputs. Accordingly, computing device 104 of FIG. 1 may receive user-input datum 224A into input field 148 of display device 132. User-input datum 224A may describe data for updating threshold value 124 that is initially described by, for example subject process 116. In addition, in some embodiments, either the user or a third-party may dictate subject process 116 by inputting subject process 116 into computing device 104. Classifier 134 of machine-learning module 130 may classify one or more instances of subject process 116 relative to, for example, subject process 116 (e.g., also in the context of confidence, such as achieving an optimum confidence level). Accordingly, in some embodiments, classifier 134 may classify instances of subject process 116 that more closely relate to or resemble threshold value 124 within a closer proximity to threshold value 124.

Still referring to FIG. 1, in some embodiments, a scoring function representing a desired form of relationship to be detected between inputs and outputs may be used by described machine learning processes. Such as scoring function may, for instance, seek to maximize the probability that a given input (e.g., datasets 108) and/or combination of elements and/or inputs (e.g., subject process 116 and/or threshold value 124) is associated with a given output (e.g., the described instruction set) to minimize the probability that a given input (e.g., each dataset of the plurality of datasets describes a plurality of actions performed by an entity) is not associated with a given undesirable output (e.g., describes a set of actions to be performed by the entity to increase proximity of the subject process of the entity to an irrelevant instance of outlier cluster 112, such as an instance of outlier cluster 112 the describes a mindset of the entity that's not as immediately relevant as to what is desired by the entity, etc.).

some instances, in one or more embodiments, computing device 104 is configured to receive an element of subject process 116. In addition, or the alternative, computing device 104 is configured to receive one or more instances of outlier cluster 112. Accordingly, in this example, subject process 116 may be determined or identified using one or more outlier clusters. More particularly, described machine-learning processes may use, as inputs, one or more instances of datasets 108, outlier cluster 112, subject process 116, and/or threshold value 124 in combination with the other data described herein, and use one or more associated outlier cluster elements with target outputs, such as instruction set 224B. As a result, in some instances, classifier 134 may classify inputs to target outputs including associated outlier cluster elements to generate instruction set 224B.

In addition, and without limitation, in some cases, database 150 may be local to computing device 104. In another example, and without limitation, database 150 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 150. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 150 may include keywords. As used in this disclosure, a "keyword" is an element of word or syntax used to identify and/or match elements to each other. For example, without limitation, a keyword may be "income-generation" in the instance that a suer is seeking to increase income. In another non-limiting example, keywords of a key-phrase may be "leisure" in an example where the user is seeking to increase leisure-related activities and the like. Database 150 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, a "classifier," as used in this disclosure is type or operational sub-unit of any described machine-learning model or process executed by machine-learning module 130, such as a mathematical model, neural net, or program generated by a machine-learning algorithm known as a "classification algorithm" that distributes inputs into categories or bins of data, outputting the categories or bins of data and/or labels associated therewith. A classifier may be configured to classify and/or output a datum (e.g., one or more instances of any one or more of datasets 108, outlier cluster 112, subject process 116, and/or subject process 116 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 134 to classify one or more instances of any one or more of datasets 108, outlier cluster 112, subject process 116, and/or subject process 116 based on user attribute data 154 and/or label data 158. Accordingly, classifier 134 of machine-learning module 130 may classify attributes within user attribute data 154 related to modifying a sequence of activities in the first activity pattern and adjusting the second activity pattern based on modification of the first activity pattern. User attribute data 154 may include an attribute cluster, wherein the "attribute cluster," as described herein is a collection of at least one attribute of described entity. An attribute may include any or all of a feature, section, knowledge, asset, or skill of an entity. Attribute cluster may include a single attribute of the entity, or it may include more than one attribute. Attribute cluster may include multiple related attributes. In a non-limiting example, attribute cluster may include any attribute cluster described in U.S. patent Ser. No. 18/141,320, filed on Apr. 28, 2023, titled "METHOD AND AN APPARATUS FOR ROUTINE IMPROVEMENT FOR AN ENTITY," which entirety is incorporated herein by reference.

In addition, in some embodiments, machine-learning module 130 performing the described correlations may be supervised. Alternatively, in other embodiments, machine-learning module 130 performing the described correlations may be unsupervised. In addition, classifier 134 may label various data (e.g., one or more instances of any one or more of datasets 108, outlier cluster 112, subject process 116, and/or subject process 116 as well as other elements of data produced, stored, categorized, aggregated, or otherwise manipulated by the described processes) using machine-learning module 130. For example, machine-learning module 130 may label certain relevant parameters of one or more instances of datasets 108 with parameters of one or more user attribute data 154.

In addition, machine-learning processes performed by machine-learning module 130 may be trained using one or more instances of label data 158 to, for example, more heavily weigh or consider instances of label data 158 deemed to be more relevant to the business. More specifically, in one or more embodiments, label data 158 may be based on or include correlations of parameters associated with datasets 108 to parameters of user attribute data 154. In addition, label data 158 may be partially based on earlier iterations of machine-learning processes executed by machine-learning module 130. In some instances, running machine-learning module 130 over multiple iterations refines correlation of parameters or data describing entity operations (e.g., associated with datasets 108) with parameters describing user attribute data 154.

Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naive Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Referring now to FIG. 3, an exemplary embodiment of label matching database 300 is illustrated. In one or more embodiments, label matching database 300 may be an example of database 150 of FIG. 1. database may, as a non-limiting example, organize data stored in the user activity database according to one or more database tables. One or more database tables may be linked to one another by, for instance, common column values. For instance, a common column between two tables of expert database may include an identifier of a submission, such as a form entry, textual submission, or the like, for instance as defined below; as a result, a may be able to retrieve all rows from any table pertaining to a given submission or set thereof. Other columns may include any other category usable for organization or subdivision of expert data, including types of data, identifiers of interface data structures relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of user attribute data 154 and/or other data types, e.g., one or more instance of datasets 108, outlier cluster 112, subject process 116 and/or subject process 116, as well as threshold value 124, categorized in multiple tables from resource allocation database 300. For example, as shown in FIG. 3, label matching database 300 may be generated with multiple categories including mindset label 304, scoring label 308, screening label 312 and expansion label 316. Consequently, the described processes may classify one or more instances of datasets 108 from mindset label 304 to outlier cluster 112 and/or user-input datum 224A that may be input user input field 148 of FIG. 1. In some instances, user-input datum 224A may describe data for selecting a preferred attribute of any one or more skills associated with one or more instances of subject process 116. In addition, described processes may retrieve data describing additional attributes related to the preferred attribute of threshold value 124 from label matching database 300 connected with the processor based on mindset label 304 (e.g., or, alternatively, one or more of scoring label 308, screening label 312, and/or expansion label 316, etc.).

Figure 4:
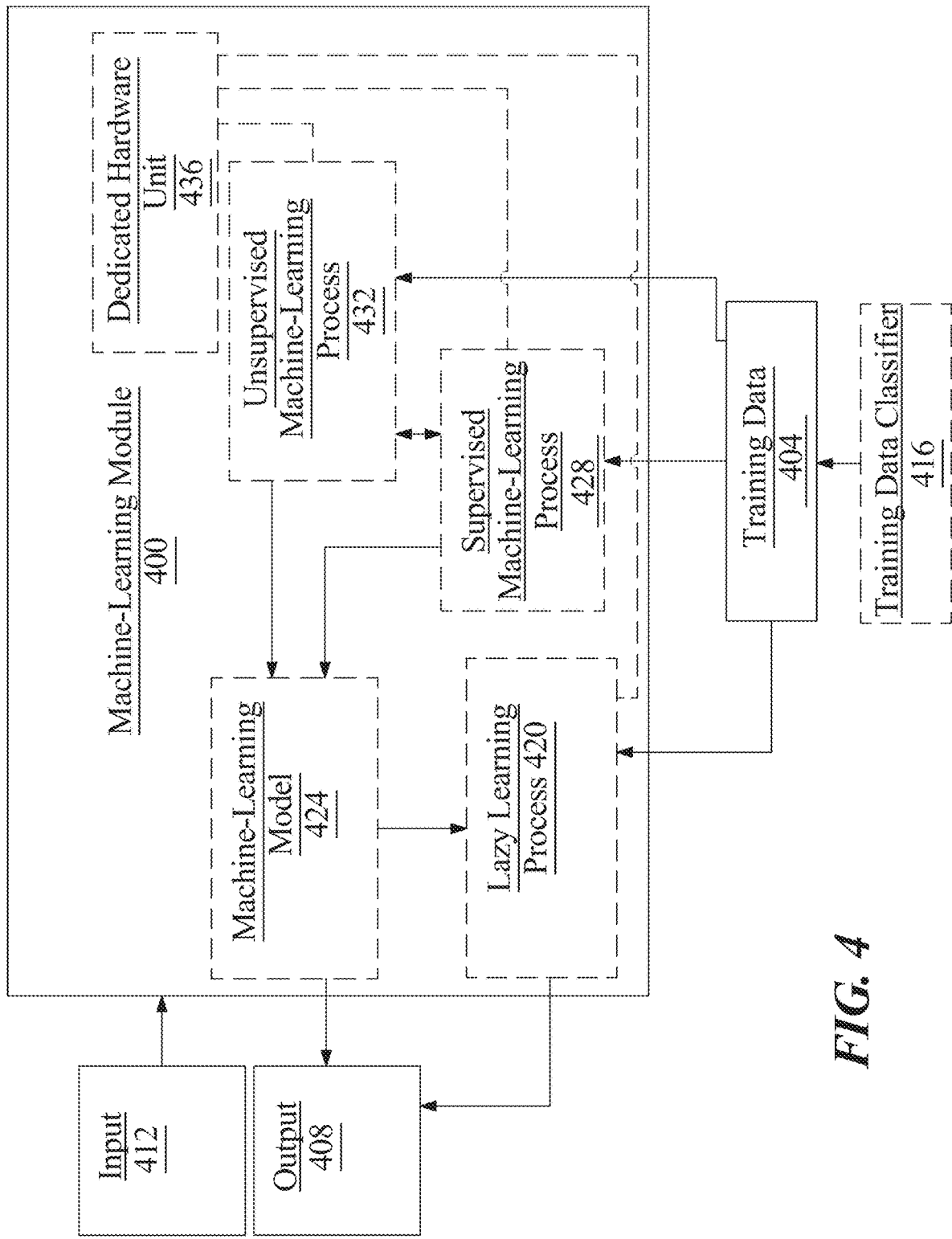
FIG. 4 is a block diagram of exemplary machine-learning processes.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, training data 404 used by machine-learning module 400 may correlate plurality of dataset as input correlated to a plurality of outlier clusters as output.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a plurality of sub-entities as described herein. By classifying training data, machine-leaning module 200 may build models specific to each sub-entity which allow for a more detailed analysis of each group's datasets, leading to a better fit of machine-learning model to classified data.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of datasets as described above as inputs, plurality of outlier clusters as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
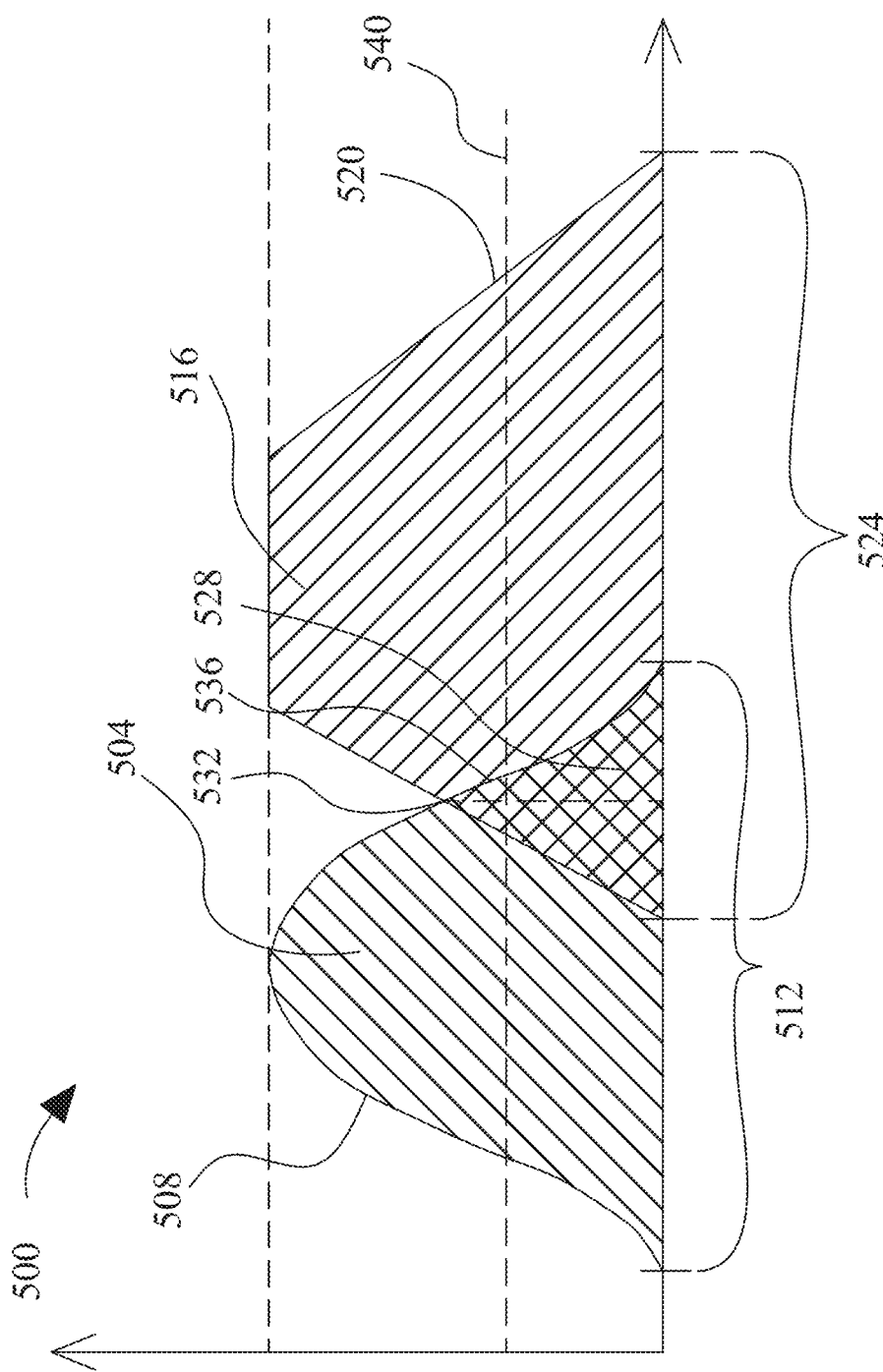
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor 144 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of datasets 108, outlier cluster 112, as well as label data 158 and/or user attribute data 154, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of datasets 108, outlier cluster 112, as well as label data 158 and/or user attribute data 154, and a predetermined class, such as without limitation, data or information including interface data structures stored in label matching database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of datasets 108, outlier cluster 112, subject process 116, and/or subject process 116, as well as label data 158 and/or user attribute data 154 and a predetermined class, such as without limitation, data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of datasets 108, outlier cluster 112, subject process 116, and/or subject process 116, to as well as label data 158 and/or user attribute data 154 stored in resource allocation database 300. For instance, if datasets 108 and/or interface data structure 112 has a fuzzy set matching certain interface data structure data values stored in label matching database 300 (e.g., by having a degree of overlap exceeding a threshold), computing device 104 may classify one or more instances of any one or more of datasets 108, outlier cluster 112, subject process 116, and/or subject process 116 as belonging to user attribute data 154 (e.g., aspects of user behavior as demonstrated by user attribute data 154 of FIG. 1 and/or scoring label 308 of FIG. 3 relating to user commitment towards achieving subject process 116). Where multiple fuzzy matches are performed, degrees of match for each respective fuzzy set may be computed and aggregated through, for instance, addition, averaging, or the like, to determine an overall degree of match.

Still referring to FIG. 5, in an embodiment, datasets 108 and/or outlier cluster 112 may be compared to multiple label matching database 300 categorization fuzzy sets. For instance, datasets 108 and/or outlier cluster 112 may be represented by a fuzzy set that is compared to each of the multiple label matching database 300 categorization fuzzy sets; and a degree of overlap exceeding a threshold between the datasets 108 and/or outlier cluster 112 fuzzy set and any of the label matching database 300 categorization fuzzy sets may cause computing device 104 to classify one or more instances of any one or more of datasets 108, outlier cluster 112, subject process 116, and/or subject process 116 as belonging to one or more corresponding interface data structures associated with label matching database 300 categorization (e.g., selection from categories in resource allocation database 300, etc.). For instance, in one embodiment there may be two label matching database 300 categorization fuzzy sets, representing, respectively, label matching database 300 categorization (e.g., into each of mindset label 304, scoring label 308, screening label 312, and/or expansion label 316). For example, a First label matching database 300 categorization may have a first fuzzy set; a Second label matching database 300 categorization may have a second fuzzy set; and one or more instances of any one or more of datasets 108, outlier cluster 112, subject process 116, and/or subject process 116, to as well as label data 158 and/or user attribute data 154 may each have a corresponding fuzzy set. Computing device 104, for example, may compare one or more instances of any one or more of datasets 108, outlier cluster 112, subject process 116, and/or subject process 116, to as well as label data 158 and/or user attribute data 154 fuzzy sets with fuzzy set data describing each of the categories included in resource allocation database 300, as described above, and classify one or more instances of any one or more of datasets 108, outlier cluster 112, subject process 116, and/or subject process 116, to as well as label data 158 and/or user attribute data 154 to one or more categories (e.g., mindset label 304, scoring label 308, screening label 312, and/or expansion label 316). Machine-learning methods as described throughout may, in a non-limiting example, generate coefficients used in fuzzy set equations as described above, such as without limitation x, c, and σ of a Gaussian set as described above, as outputs of machine-learning methods. Likewise, any described datum herein may be used indirectly to determine a fuzzy set, as, for example, datasets 108 fuzzy set and/or outlier cluster 112 fuzzy set may be derived from outputs of one or more machine-learning models that take datasets 108 and/or outlier cluster 112 directly or indirectly as inputs.

Still referring to FIG. 5, a computing device may use a logic comparison program, such as, but not limited to, a fuzzy logic model to determine a label matching database 300 response. A label matching database 300 response may include, but is not limited to, accessing and/or otherwise communicating with any one or more of mindset label 304, scoring label 308, screening label 312, expansion label 316, and the like; each such label matching database 300 response may be represented as a value for a linguistic variable representing label matching database 300 response or in other words a fuzzy set as described above that corresponds to a degree of matching between data describing datasets 108 and/or outlier cluster 112 and one or more categories within label matching database 300 as calculated using any statistical, machine-learning, or other method that may occur to a person skilled in the art upon reviewing the entirety of this disclosure.

In some embodiments, determining a label matching database 300 categorization may include using a linear regression model. A linear regression model may include a machine-learning model. A linear regression model may be configured to map data of datasets 108 and/or outlier cluster 112, to one or more label matching database 300 parameters. A linear regression model may be trained using a machine-learning process. A linear regression model may map statistics such as, but not limited to, quality of datasets 108 and/or outlier cluster 112. In some embodiments, determining label matching database 300 of datasets 108 and/or outlier cluster 112 may include using a label matching database 300 classification model. A label matching database 300 classification model may be configured to input collected data and cluster data to a centroid based on, but not limited to, frequency of appearance, linguistic indicators of quality, and the like. Centroids may include scores assigned to them such that quality of datasets 108 and/or outlier cluster 112 may each be assigned a score.

In some embodiments, label matching database 300 classification model may include a K-means clustering model. In some embodiments, label matching database 300 classification model may include a particle swarm optimization model. In some embodiments, determining the label matching database 300 of datasets 108 and/or outlier cluster 112 may include using a fuzzy inference engine (e.g., to assess the progress of the user and use said data to amend or generate new strategies based on user progress). A fuzzy inference engine may be configured to map one or more instances of any one or more of datasets 108, outlier cluster 112, as well as label data 158 and/or user attribute data 154 data elements using fuzzy logic. In some embodiments, the described datum may be arranged by a logic comparison program into label matching database 300 arrangement. A "label matching database 300 arrangement" as used in this disclosure is any grouping of objects and/or data based on similarity to each other and/or relation to providing instruction set 224B of FIG. 2B to the user for the user to achieve. This step may be implemented as described above in FIG. 1.

Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to datasets 108 and/or outlier cluster 112, such as a degree of matching between data describing user aspirations and strategies based on responses to interface data structures stored in resource allocation database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is 'deficient'"— the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity ($T(a, b)=T(b, a)$), monotonicity: ($T(a, b) \leq T(c, d)$ if $a \leq c$ and $b \leq d$), (associativity: $T(a, T(b, c))=T(T(a, b), c)$), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: $\bot(a, b)=\bot(b, a)$, monotonicity: $\bot(a, b) \leq \bot(c, d)$ if $a \leq c$ and $b \leq d$, associativity: $\bot(a, \bot(b, c))=\bot(\bot(a, b), c)$, and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
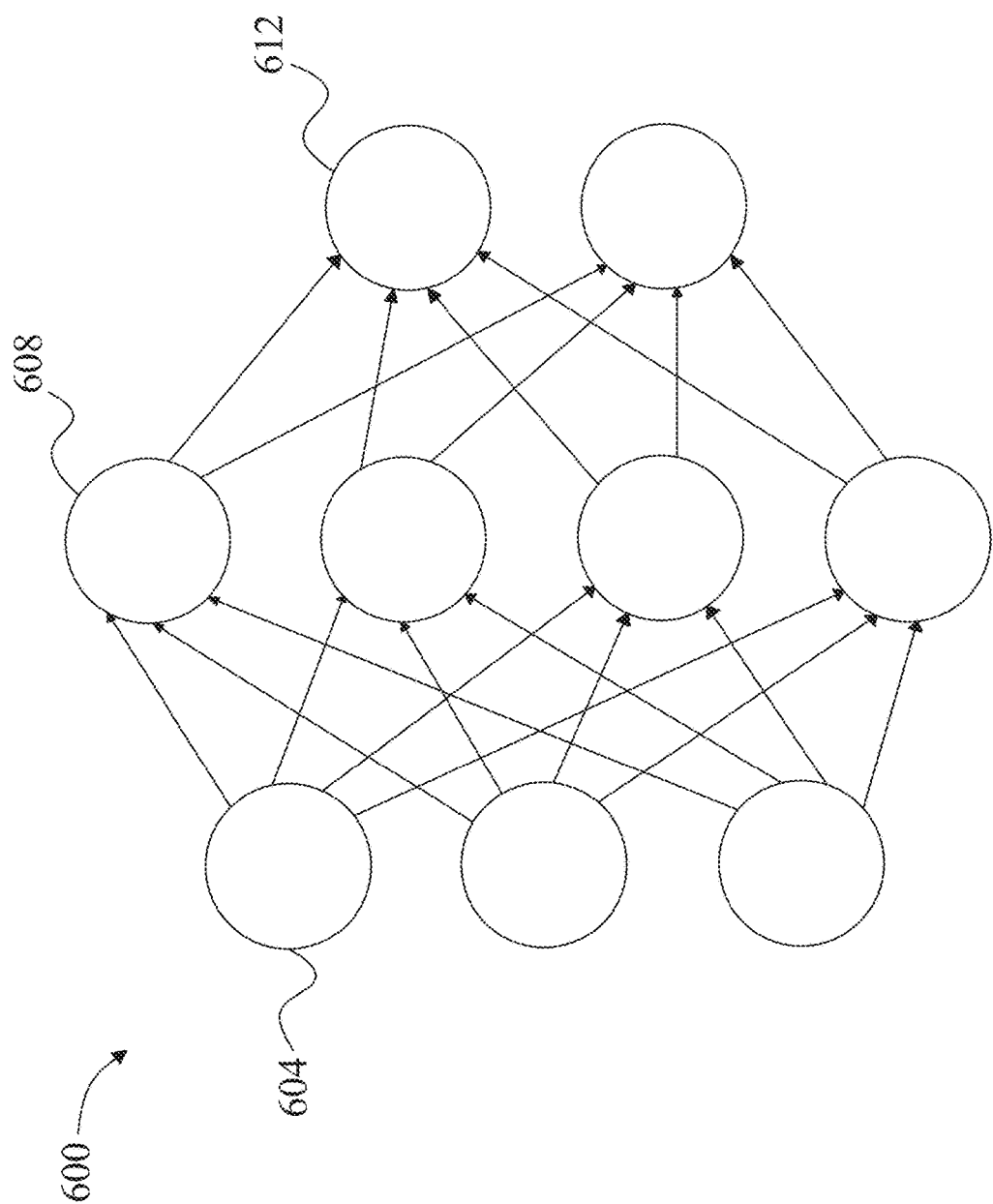
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
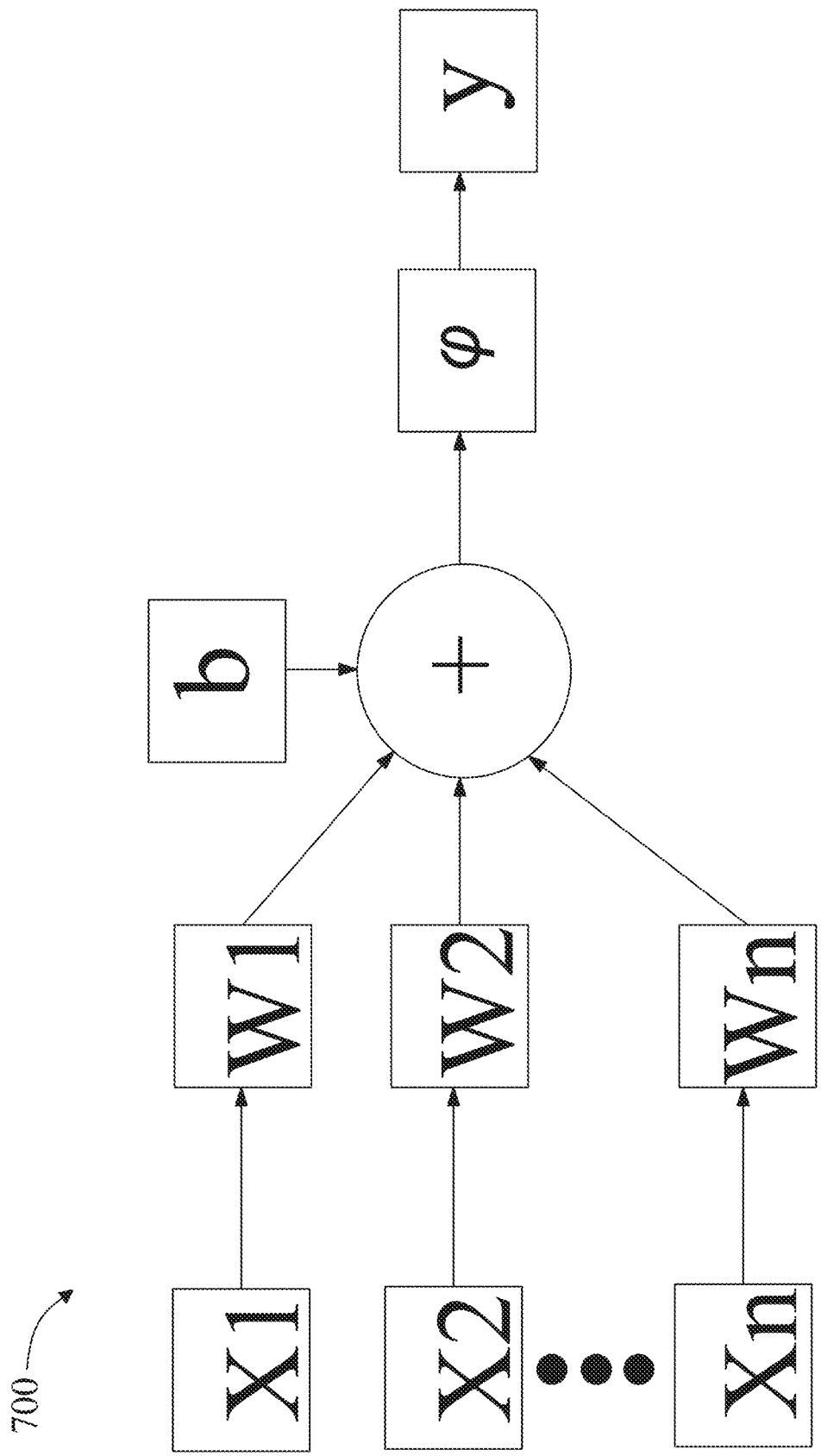
FIG. 7 is a diagram of an exemplary embodiment of a node of a neural network.

Referring now to FIG. 7, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs z. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
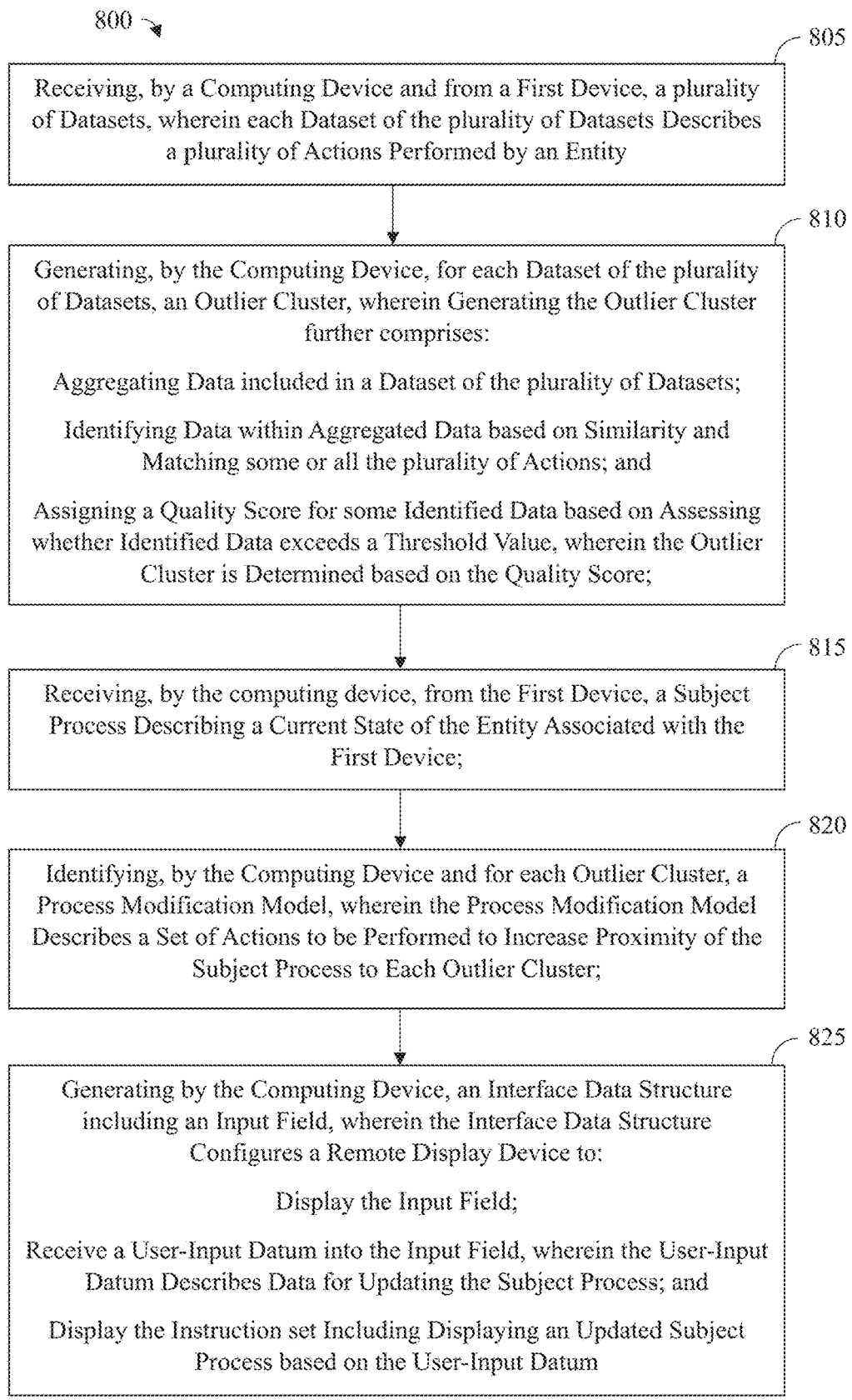
FIG. 8 is a flow diagram of an exemplary method for generating an instruction set for a user.

Now referring to FIG. 8, method 800 for determining an instruction set is described. At step 805, method 800 includes receiving, by a computing device and from a user device, a plurality of datasets, wherein each dataset of the plurality of datasets describes a plurality of actions performed by an entity. This step may be implemented as described above, without limitation, in FIGS. 1-7.

Still referring to FIG. 8, at step 810, method 800 includes generating, by the computing device, for each dataset of the plurality of datasets, an outlier cluster, wherein generating the outlier cluster further comprises aggregating data included in a dataset of the plurality of datasets; identifying data within aggregated data based on similarity and matching some or all the plurality of actions; and assigning a quality score for some identified data based on assessing whether identified data exceeds a threshold value, wherein the outlier cluster is determined based on the quality score. This step may be implemented as described above, without limitation, in FIGS. 1-7.

Still referring to FIG. 8, at step 815, method 800 includes receiving, by the computing device, from the user device, a subject process describing a current state of the entity associated with the user device. This step may be implemented as described above, without limitation, in FIGS. 1-7.

Still referring to FIG. 8, at step 820, method 800 includes identifying, by the computing device and for each outlier cluster, a process modification model, wherein the process modification model describes a set of actions to be performed to increase proximity of the subject process to each outlier cluster. This step may be implemented as described above, without limitation, in FIGS. 1-7.

Still referring to FIG. 8, at step 825, method 800 includes generating by the computing device, an interface data structure including an input field, wherein the interface data structure configures a remote display device to: display the input field; receive a user-input datum into the input field, wherein the user-input datum describes data for updating the subject process; and display the instruction set including displaying an updated subject process based on the user-input datum. This step may be implemented as described above, without limitation, in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
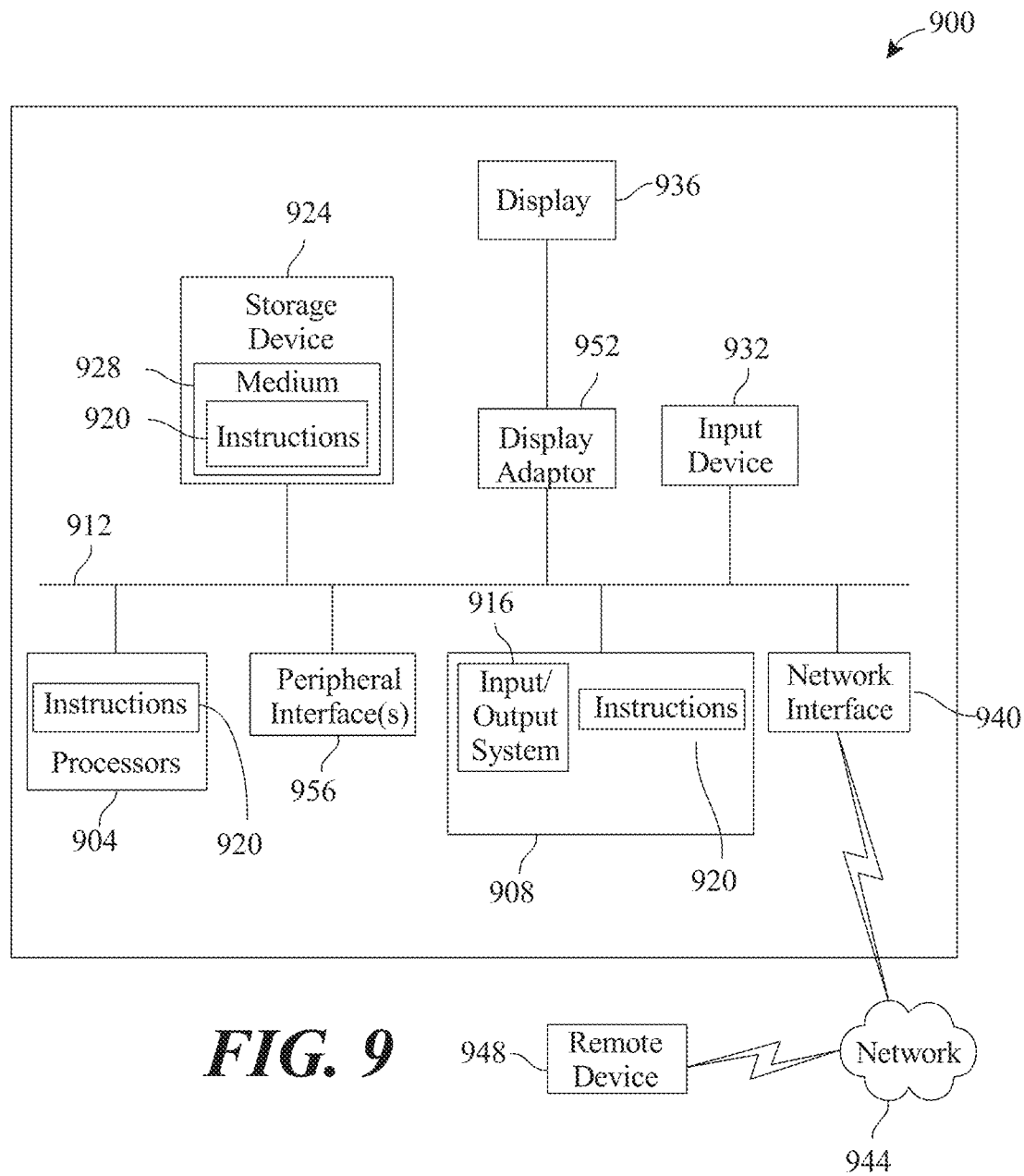
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Video display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for determining an instruction set, the apparatus comprising:
   a processor;
   a memory connected to the processor, the memory containing instructions configuring the processor to:
      receive, from a user device, a plurality of datasets, wherein each dataset of the plurality of datasets describes a plurality of actions performed by an entity;
      generate, for each dataset of the plurality of datasets, an outlier cluster, wherein generating the outlier cluster further comprises:
         aggregating data included in each dataset of the plurality of datasets;
         identifying data within aggregated data based on similarity and matching at least a portion of the plurality of actions;
         assigning a quality score for the identified data based on assessing whether the identified data exceeds a threshold value; and
         generating the outlier cluster as a function of the quality score;

receive, from the user device, a subject process describing a current state of the entity associated with the user device;
identify, for the outlier cluster of each dataset, a process modification model, wherein the process modification model describes a set of actions to be performed to increase a proximity of the subject process to the outlier cluster;
generate an interface data structure including an input field, wherein the interface data structure configures a remote display device to:
display the input field;
receive a user-input datum from the input field, wherein the user-input datum describes data for updating the subject process; and
display an instruction set determined using the process modification model, wherein displaying the instruction set comprises displaying an updated subject process based on the user-input datum.

2. The apparatus of claim 1, wherein generating the interface data structure comprises:
retrieving user attribute data;
displaying a representation of a first label and a second label selected from a plurality of labels in a grid based on retrieved user attribute data;
generating the interface data structure based on the user attribute data, wherein generating the interface data structure further comprises:
determining a vector from the representation of the first label to the second label; and
configuring the remote display device to display the vector.

3. The apparatus of claim 2, wherein determining the vector from the first label to the second label comprises:
generating the vector including an angle value and a distance value, wherein the angle value and the distance value describe a divergence value between data describing the subject process and the threshold value.

4. The apparatus of claim 2, wherein determining the vector from the first label to the second label comprises:
organizing the plurality of labels based on their respective proximity to a minimal output type and a maximum output type;
aggregating the first label based on organization of the plurality of labels; and
classifying the aggregated first label data to a label having a closest proximity value to the maximum output type.

5. The apparatus of claim 1, wherein generating the subject process comprises:
retrieving current preference data of the user device between a minimum value and a maximum value from a database, wherein retrieving current preference data comprises:
receiving a form element input using the input field.

6. The apparatus of claim 1, wherein the memory contains instructions configuring the processor to:
generate an additional input field by comparing the subject process with the outlier cluster of each dataset.

7. The apparatus of claim 6, wherein the memory contains instructions configuring the processor to:
determine a pattern, wherein the pattern describes user interaction with a database;
classify an element of the pattern to the divergence value; and
adjust the pattern based on a magnitude of the divergence value.

8. The apparatus of claim 1, wherein the memory contains instructions configuring the processor to:
classify the subject process to the threshold value;
determine a proximity value of the subject process to the threshold value based on classification; and
adjust the threshold value to minimize the proximity value.

9. The apparatus of claim 8, wherein classifying data describing the subject process to the threshold value comprises:
comparing the subject process to the threshold value; and
determining a parity value based on the comparison of the subject process to the threshold value, wherein the parity value is included within the instruction set.

10. The apparatus of claim 3, wherein receiving the user-input datum comprises:
evaluating the user-input datum, wherein evaluating the user input datum comprises:
classifying a second user-input datum to the threshold value;
generating the vector based on the classification; and
display the divergence value of the vector hierarchically based on a magnitude of the divergence value.

11. A method for determining an instruction set, the method comprising:
receiving, by a computing device and from a user device, a plurality of datasets, wherein each dataset of the plurality of datasets describes a plurality of actions performed by an entity;
generating, by the computing device, for each dataset of the plurality of datasets, an outlier cluster, wherein generating the outlier cluster further comprises:
aggregating data included in a dataset of the plurality of datasets;
identifying data within aggregated data based on similarity and matching at least a portion of the plurality of actions;
assigning a quality score for the identified data based on assessing whether the identified data exceeds a threshold value; and
generating the outlier cluster as a function of the quality score;
receiving, by the computing device, from the user device, a subject process describing a current state of the entity associated with the user device;
identifying, by the computing device, for the outlier cluster of each dataset, a process modification model, wherein the process modification model describes a set of actions to be performed to increase a proximity of the subject process to the outlier cluster;
generating by the computing device, an interface data structure including an input field, wherein the interface data structure configures a remote display device to:
display the input field;
receive a user-input datum from the input field, wherein the user-input datum describes data for updating the subject process; and
display an instruction set determined using the process modification model, wherein displaying the instruction set comprises displaying an updated subject process based on the user-input datum.

12. The method of claim 11, wherein generating the interface data structure comprises:
retrieving user attribute data;
displaying a representation of a first label and a second label selected from a plurality of labels in a grid based on retrieved user attribute data;

generating the interface data structure based on the user attribute data, wherein generating the interface data structure further comprises:
  determining a vector from the representation of the first label to the second label; and
  configuring the remote display device to display the vector.

13. The method of claim 12, wherein determining the vector from the first label to the second label comprises:
  generating the vector including an angle value and a distance value, wherein the angle value and the distance value describe a divergence value between data describing the subject process and the threshold value.

14. The method of claim 12, wherein determining the vector from the first label to the second label comprises:
  organizing the plurality of labels based on their respective proximity to a minimal output type and a maximum output type;
  aggregating the first label based on organization of the plurality of labels; and
  classifying the aggregated first label data to a label having a closest proximity value to the maximum output type.

15. The method of claim 11, wherein generating the subject process comprises:
  retrieving current preference data of the user device between a minimum value and a maximum value from a database, wherein retrieving current preference data comprises:
    receiving a form element input using the input field.

16. The method of claim 11, wherein the method further comprises a step of:
  generating an additional input field by comparing the subject process with the outlier cluster of each dataset.

17. The method of claim 16, wherein the method further comprises a step of:
  determining a pattern, wherein the pattern describes user interaction with a database;
  classifying an element of the pattern to the divergence value; and
  adjusting the pattern based on a magnitude of the divergence value.

18. The method of claim 11, wherein the method further comprises a step of:
  classifying the subject process to the threshold value;
  determining a proximity value of the subject process to the threshold value based on classification; and
  adjusting the threshold value to minimize the proximity value.

19. The method of claim 18, wherein classifying data describing the subject process to the threshold value comprises:
  comparing the subject process to the threshold value; and
  determining a parity value based on the comparison of the subject process to the threshold value, wherein the parity value is included within the instruction set.

20. The method of claim 13, receiving the user-input datum comprises:
  evaluating the user-input datum, wherein evaluating the user-input datum comprises:
    classifying a second user-input datum to the threshold value;
    generating the vector based on the classification; and
    displaying the divergence value of the vector hierarchically based on a magnitude of divergence value.

* * * * *